United States Patent
Xiang et al.

(10) Patent No.: US 12,037,015 B2
(45) Date of Patent: Jul. 16, 2024

(54) VEHICLE CONTROL DEVICE AND VEHICLE CONTROL METHOD

(71) Applicant: DENSO CORPORATION, Kariya (JP)

(72) Inventors: Jingyu Xiang, Nisshin (JP); Takenori Matsue, Nisshin (JP); Yotaro Motegi, Nisshin (JP); Osamu Shimomura, Nisshin (JP); Hiroyuki Osawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 259 days.

(21) Appl. No.: 17/385,168

(22) Filed: Jul. 26, 2021

(65) Prior Publication Data
US 2022/0032955 A1 Feb. 3, 2022

(30) Foreign Application Priority Data
Jul. 28, 2020 (JP) .................. 2020-127506

(51) Int. Cl.
*B60W 60/00* (2020.01)
*B60W 50/038* (2012.01)
(Continued)

(52) U.S. Cl.
CPC ...... *B60W 60/0015* (2020.02); *B60W 50/038* (2013.01); *G06V 20/56* (2022.01); *B60W 2420/403* (2013.01); *B60W 2420/408* (2024.01); *B60W 2420/54* (2013.01); *B60W 2554/4041* (2020.02); *G08G 1/16* (2013.01)

(58) Field of Classification Search
CPC ... B60W 2050/021; B60W 2050/0215; B60W 2050/0292; B60W 2420/42; B60W 2420/52; B60W 2420/54; B60W 2554/4041; B60W 2556/35; B60W 50/0205; B60W 50/029; B60W 50/038; B60W 60/0015; G06V 20/56; G06V 20/58; G06V 20/588; G08G 1/16
See application file for complete search history.

(56) References Cited

U.S. PATENT DOCUMENTS 8,630,806 B1 * 1/2014 Zhu .................. G08G 1/165
                                                 701/523
10,061,312 B1 * 8/2018 Anderson ............ G05D 1/0055
(Continued)

FOREIGN PATENT DOCUMENTS

| CN | 114556139 A * | 5/2022 | ............. G01S 17/86 |
| JP | 2010-064691 A | 3/2010 | |
| WO | 2017/158951 A1 | 9/2017 | |

*Primary Examiner* — Babar Sarwar
(74) *Attorney, Agent, or Firm* — MASCHOFF BRENNAN

(57) ABSTRACT

An automatic drive device includes a fusion unit recognizing travel environment of a vehicle based on an output signal of a surrounding monitoring sensor and a control planning unit generating a control plan based on a recognition result of the fusion unit. A diagnostic device includes an abnormality detection unit that detects an abnormality of a field recognition system from the surrounding monitoring sensor to the fusion unit by monitoring the output signal of the surrounding monitoring sensor and the recognition result of the fusion unit over time. The diagnostic device requests the control planning unit to perform MRM based on a detection of the abnormality of the recognition system by the abnormality detection unit.

17 Claims, 12 Drawing Sheets

(51) Int. Cl.
*G06V 20/56* (2022.01)
*G08G 1/16* (2006.01)

(56) References Cited

U.S. PATENT DOCUMENTS

| | | | |
|---|---|---|---|
| 10,891,495 B2* | 1/2021 | Takamatsu | G06T 7/85 |
| 11,227,409 B1* | 1/2022 | Wu | G06V 10/80 |
| 11,582,112 B2* | 2/2023 | Ukai | H04L 12/40143 |
| 2015/0112571 A1* | 4/2015 | Schmudderich | B60W 30/14 |
| | | | 701/1 |
| 2016/0091315 A1* | 3/2016 | Oguri | G01S 19/40 |
| | | | 701/408 |
| 2016/0121906 A1 | 5/2016 | Matsuno et al. | |
| 2017/0123428 A1* | 5/2017 | Levinson | G05D 1/0291 |
| 2017/0371340 A1* | 12/2017 | Cohen | G06T 7/521 |
| 2017/0371343 A1 | 12/2017 | Cohen et al. | |
| 2017/0371344 A1 | 12/2017 | Cohen et al. | |
| 2017/0371345 A1 | 12/2017 | Cohen et al. | |
| 2017/0371347 A1 | 12/2017 | Cohen et al. | |
| 2018/0194364 A1* | 7/2018 | Asakura | B60W 60/0059 |
| 2019/0077411 A1* | 3/2019 | Oishi | B60L 3/00 |
| 2019/0279508 A1* | 9/2019 | Wang | H04W 4/46 |
| 2019/0283671 A1* | 9/2019 | Shimomura | G08G 1/166 |
| 2019/0291727 A1 | 9/2019 | Shalev-Shwartz et al. | |
| 2019/0294897 A1 | 9/2019 | Cohen et al. | |
| 2019/0295179 A1 | 9/2019 | Shalev-Shwartz et al. | |
| 2019/0299983 A1 | 10/2019 | Shalev-Shwartz et al. | |
| 2019/0329768 A1 | 10/2019 | Shalev-Shwartz et al. | |
| 2019/0329769 A1 | 10/2019 | Shalev-Shwartz et al. | |
| 2019/0329773 A1 | 10/2019 | Shalev-Shwartz et al. | |
| 2019/0329782 A1 | 10/2019 | Shalev-Shwartz et al. | |
| 2019/0329783 A1 | 10/2019 | Shalev-Shwartz et al. | |
| 2019/0333381 A1 | 10/2019 | Shalev-Shwartz et al. | |
| 2019/0382031 A1* | 12/2019 | Hu | B60W 50/0205 |
| 2020/0070847 A1* | 3/2020 | Horiguchi | B60W 50/04 |
| 2020/0133259 A1 | 4/2020 | Van Wiemeersch | H04W 4/40 |
| 2020/0156640 A1* | 5/2020 | Jonasson | B60W 30/143 |
| 2020/0207362 A1 | 7/2020 | Nishida et al. | |
| 2021/0004610 A1* | 1/2021 | Huang | G01S 7/4814 |
| 2021/0056327 A1 | 2/2021 | Cohen et al. | |
| 2021/0134079 A1* | 5/2021 | Nee | G01S 7/4972 |
| 2021/0256257 A1* | 8/2021 | Taccari | G06N 3/08 |
| 2021/0303898 A1* | 9/2021 | Wang | G06V 20/10 |
| 2021/0394770 A1* | 12/2021 | Rocha | G06V 20/56 |

* cited by examiner

FIG. 4

|  | DIAGNOSIS RESULT | DEGREE OF USE (%) |
|---|---|---|
| SENSOR A | ○ | 100 |
| SENSOR B | ○ | 90 |
| SENSOR C | ○ | 60 |
| SENSOR D | ○ | 5 |

FIG. 5

|  | DIAGNOSIS RESULT | DEGREE OF USE (%) |
|---|---|---|
| SENSOR A | ○ | 100 |
| SENSOR B | ○ | 90 |
| SENSOR C | ○ | 60 |
| SENSOR D | × | 5 |

FIG. 6

|  | DIAGNOSIS RESULT | DEGREE OF USE (%) |
|---|---|---|
| SENSOR A | ○ | 100 |
| SENSOR B | ○ | 90 |
| SENSOR C | × | 60 |
| SENSOR D | ○ | 5 |

VEHICLE CONTROL DEVICE AND VEHICLE CONTROL METHOD

CROSS REFERENCE TO RELATED APPLICATION

The present application is based on and claims the benefit of priority of Japanese Patent Application No. 2020-127506, filed on Jul. 28, 2020, the disclosure of which is incorporated herein by reference.

TECHNICAL FIELD

The present disclosure generally relates to a technique for generating a control plan for an automatic driving vehicle.

BACKGROUND INFORMATION

In an RSS (Responsibility Sensitive Safety) model, a planner, which is a functional block for formulating a control plan, calculates a potential accident liability value for each of multiple control plans using map data, and adopts a control plan in which the potential accident liability value is within a permissible range. The potential accident liability value is a parameter indicating the degree of liability of a subject vehicle in the event of an accident between a nearby vehicle existing around the subject vehicle and the subject vehicle. The potential accident liability value is a value considering whether or not an inter-vehicle distance between the subject vehicle and nearby vehicles is shorter than a safety distance determined based on a road structure or the like.

SUMMARY

It is an object of the present disclosure to provide a vehicle control device capable of improving safety during automatic driving.

BRIEF DESCRIPTION OF THE DRAWINGS

Objects, features, and advantages of the present disclosure will become more apparent from the following detailed description made with reference to the accompanying drawings, in which:

FIG. 4 is a diagram for explaining an operation of a risk determination unit G5;

FIG. 5 is another diagram for explaining an operation of the risk determination unit G5;

FIG. 6 is yet another diagram for explaining an operation of the risk determination unit G5;

DETAILED DESCRIPTION

Embodiments of a vehicle control system 1 to which a vehicle control device according to the present disclosure is applied will be described with reference to the drawings. In the following, the explanation will be given by taking as an example of an area where left-hand traffic is legalized. In areas where right-hand traffic is legal, the left and right sides can be reversed. The present disclosure can be appropriately modified and implemented as to conform to the laws and customs of the area where the vehicle control system 1 is used.

First Embodiment

Figure 1:
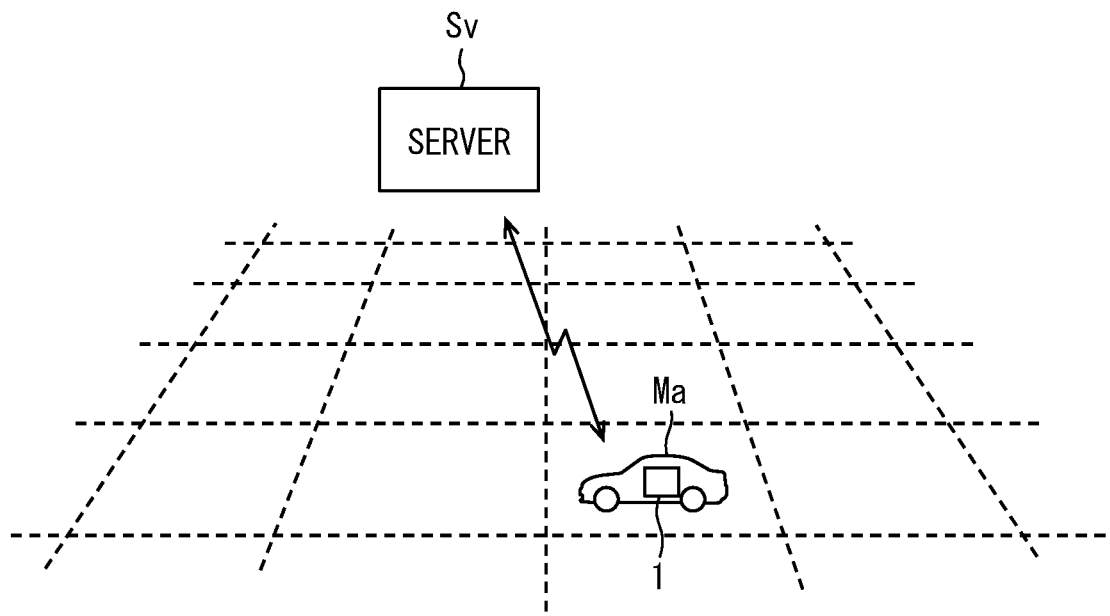
FIG. 1 is a diagram for explaining a configuration of an automatic driving system.

Hereinafter, the first embodiment of the present disclosure will be described with reference to the drawings. FIG. 1 is a diagram showing an example of a configuration of an automatic driving system according to the present disclosure. As shown in FIG. 1, the automatic driving system includes a vehicle control system 1 built on a vehicle Ma and an external server Sv. The vehicle control system 1 can be installed/mounted on a vehicle that can travel on a road, and the vehicle Ma may be a four-wheeled vehicle, as well as a two-wheeled vehicle, a three-wheeled vehicle, or the like. Motorized bicycles can also be included in two-wheeled vehicles. The vehicle Ma may be an owner car owned by an individual, a shared car, or a service car. Service cars include taxis, fixed-route buses, and shared buses. The taxi or bus may be a robot taxi or the like on which has no driver on board.

The vehicle control system 1 downloads partial map data, which is local, high-precision map data, from the external server Sv by performing wireless communication with the external server Sv, and uses it for automatic driving and navigation. Hereinafter, the vehicle on which the vehicle control system 1 is mounted is also described as a subject vehicle Ma, and an occupant seated in the driver's seat of the subject vehicle Ma (that is, a driver's seat occupant) may also be described as a user. The concept of a driver's seat occupant also includes an operator who has an authority to remotely control the subject vehicle Ma. The front-rear, left-right, and up-down directions in the following description are defined with reference to the subject vehicle Ma. Specifically, the front-rear direction corresponds to a longitudinal direction of the subject vehicle Ma. The left-right direction corresponds to a width direction of the subject vehicle Ma. The vertical direction corresponds to a vehicle height direction. From another point of view, the vertical direction corresponds to a direction perpendicular to a plane that is parallel to both of the front-back direction and the left-right direction.

<Map Data>

The map data held by the external server Sv will be described in the following. The map data corresponds to map data showing a road structure, position coordinates of feature objects arranged/disposed on the ground and along the road, and the like with an appropriate precision for automatic driving. Map data includes node data, link data, feature object data, and the like. The node data includes various pieces of data such as a node ID in which a unique number is assigned to each node on a map, node coordinates, a node name, a node type, a connection link ID in which a link ID of a link connected to the node and the like are described.

The link data is data about a link which is a road section connecting nodes. The link data includes various data such as a link ID which is a unique identifier for a link, link shape information (hereinafter, link shape), node coordinates for a starting side and an ending side of the link, road attributes and the like. The link shape may be represented by a coordinate sequence representing a shape of a road edge. The link shape corresponds to a road shape. The link shape may be represented by a third-order spline curve. The road attributes include, for example, a road name, a road type, a road width, lane number information indicating the number of lanes, a speed regulation value, and the like. The link data may also include data indicating a road type, such as whether a road is a motorway or a general road. The motorway here refers to a road on which pedestrians and bicycles are prohibited from entering, such as a toll road such as an expressway. The link data may include attribute information indicating whether or not the road allows autonomous driving of the vehicle. The link data may be subdivided and described for each lane.

The feature object data includes lane marking data and landmark data. The lane marking data includes a lane marking ID for each lane marking and a group of coordinate points representing an installation portion of a feature object. The lane marking data includes pattern information such as broken lines, solid lines, and road tacks. The lane marking data is associated with lane information, such as a lane ID or a link ID at lane level. A landmark is a three-dimensional structure located along a road. The three-dimensional structure along the road is, for example, a guardrail, a curb, a tree, a utility pole, a road sign, a traffic light, and the like. Road signs include guide signs such as direction signs and road name signs. The landmark data represents the position and type of each landmark. The shape and position of each feature object are represented by a group of coordinate points. POI (Point of interest) data is data indicative of the position and the type of the feature object which affects vehicle travel plans such as branch points for exiting a main highway, junctions, speed limit change points, lane change points, traffic congestions, construction sections, intersections, tunnels, toll gates, etc. POI data includes type and location information.

The map data may be three-dimensional map data including a group of feature points of a road shape and a structure. The three-dimensional map data corresponds to map data representing the positions of feature objects such as road edges, lane markings, and road signs in three-dimensional coordinates. Note that the three-dimensional map may be generated by REM (Road Experience Management) based on a captured image. In addition, the map data may include a travel trajectory model. The travel trajectory model is track data generated by statistically integrating travel trajectories of a plurality of vehicles. The travel trajectory model is, for example, an average of travel trajectories for each lane. The travel trajectory model corresponds to data indicating a travel track that serves as a reference during automatic driving.

Map data is managed by being divided into a plurality of patches. Each patch corresponds to map data for different areas. As shown in FIG. 1, for example, the map data is stored in units of map tiles in which the map recording area is divided into a rectangular shape of 2 km square. Map tiles correspond to a subordinate concept of the patch described above. Each map tile is given information that indicates a real-world area to which the map tile corresponds. Information indicating a real-world area is represented by, for example, latitude, longitude, and altitude. In addition, each map tile is given a unique ID (hereinafter, tile ID). The map data for each patch or each map tile is a part of the entire map recording area, in other words, local map data. Map tiles correspond to partial map data. The external server Sv distributes partial map data according to the position of the vehicle control system 1 based on a request from the vehicle control system 1.

Note that the shape of the map tile is not limited to a rectangular shape of 2 km square. It may have a rectangular shape of 1 km square or 4 km square. Further, the map tile may be hexagonal or circular. Each map tile may be set to partially overlap adjacent map tiles. The map recording area may be an entire country where the vehicle is used, or may be only a part of the area, i.e., the country. For example, the map recording area may be limited to an area where automatic driving of a general vehicle is permitted or an area where an automatic driving movement (e.g., bus) service is provided. In addition, the mode of dividing the map data may be defined by data size. In other words, the map recording area may be divided and managed within a range defined by the data size. In such case, each patch is set so that the amount of data is less than a predetermined value. According to such a mode, the data size in one distribution can be set to a certain value or less. The map data is updated at any time by, for example, integrating probe data uploaded from a plurality of vehicles.

<Configuration of the Vehicle Control System 1>

Figure 2:
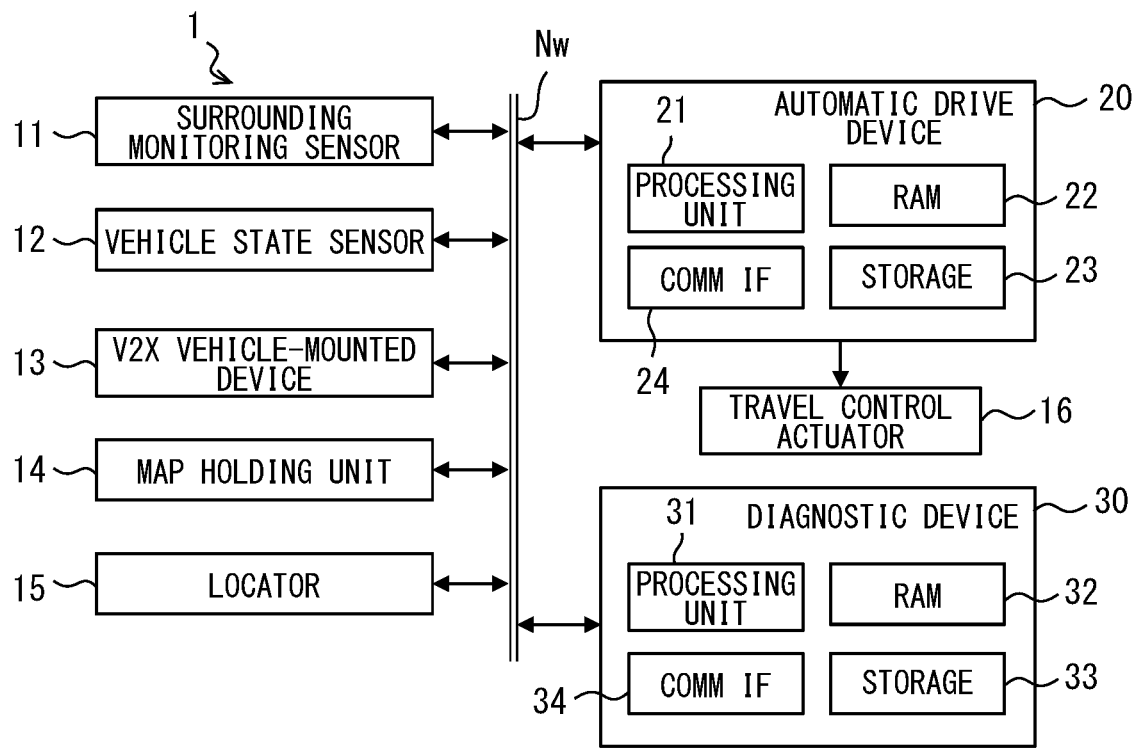
FIG. 2 is a block diagram showing a configuration of a vehicle control system 1.

Next, the configuration of the vehicle control system 1 of the first embodiment will be described with reference to FIG. 2. The vehicle control system 1 shown in FIG. 2 is used in a vehicle capable of performing automatic driving (hereinafter referred to as an automatic driving vehicle). As shown in FIG. 2, the vehicle control system 1 includes a surrounding monitoring sensor 11, a vehicle state sensor 12, a V2X vehicle-mounted device 13, a map holding unit 14, a locator 15, a travel control actuator 16, an automatic drive device 20, and a diagnostic device 30. Note that, "HMI" in the name of the description is an abbreviation for Human Machine Interface. Further, V2X is an abbreviation for Vehicle to X (Everything), and refers to communication technology that connects various things to a vehicle. The "V" in V2X refers to a vehicle as the subject vehicle Ma, and the "X" can refer to various objects other than the subject vehicle Ma, such as pedestrians, other vehicles, road equipment, networks, servers and the like.

The level indicated by "autonomous driving" in the present disclosure may be, for example, equivalent to level 3 defined by the Society of Automotive Engineers (SAE International), or may be level 4 or higher. Hereinafter, an example where the subject vehicle Ma performs automatic driving at least at the automation level 3 or higher will be described. Note that level 3 refers to a level at which the system executes all driving tasks within the operational design domain (ODD), while an operation authority is transferred from the system to the user in an emergency. The ODD defines conditions under which automatic driving can be executed, such as the traveling position being in an expressway or the like. At level 3, the user is required to be able to respond promptly when there is a request for a change/switch of operation from the system. The person who takes over the driving operation may be an operator existing outside the vehicle. Level 3 corresponds to so-called conditional automatic driving. Level 4 is a level at which the system can perform all driving tasks except under specific circumstances such as travel on a road not compatible with the automatic driving, extreme environments and the like. Level 5 is the level at which the system can perform all driving tasks in any environment. Levels 3 to 5 can also be called autonomous driving levels, which automatically execute all the controls related to the travel of the vehicle.

The surrounding monitoring sensor 11 is a sensor that monitors the "periphery" area, or surrounding, of the subject vehicle. The surrounding monitoring sensor 11 is configured to detect the presence and position of a predetermined detection target. The detection target includes, for example, a moving object such as a pedestrian or another vehicle. Another vehicle may include bicycles, motorized bicycles, and motorcycles. Further, the surrounding monitoring sensor 11 is configured to be capable of detecting a predetermined feature object. The feature objects to be detected by the surrounding monitoring sensor 11 include road edges, road markings, and three-dimensional structures installed/built along the road. Road markings refer to paint drawn on the road surface for traffic control and traffic regulation. For example, lane markings indicating lane boundaries, pedestrian crossings, stop lines, diversion zones, safety zones, regulatory arrows, etc. are included in the road markings. Lane markings are also called lane marks or lane markers. Lane markings also include those realized by road studs such as Cat's Eye (or Chatter bar) and Bot's Dots. As described above, the three-dimensional structure installed along the road is, for example, a guardrail, a road sign, a traffic light, and the like. That is, it is preferable that the surrounding monitoring sensor 11 is configured to be capable of detecting landmarks. Curbs, guardrails, walls, etc. also fall under the above three-dimensional structures. The surrounding monitoring sensor 11 may be configured to be capable of detecting a falling object, i.e., an object left dropped on the road.

As the surrounding monitoring sensor 11, for example, a peripheral monitoring camera, a millimeter-wave radar, LiDAR (Light Detection and Ranging/Laser Imaging Detection and Ranging), sonar, or the like can be adopted. The peripheral monitoring camera is an in-vehicle camera arranged to image an outside of the subject vehicle in a predetermined direction. The peripheral monitoring camera includes a front camera arranged at a position on an upper end of the windshield on a vehicle interior side, at a front grill, or the like to photograph/capture the front field of the subject vehicle Ma. The millimeter-wave radar transmits millimeter waves or quasi-millimeter waves in a predetermined direction, and analyzes the received data of the reflected waves of the transmitted waves reflected by an object, thereby detecting relative position and relative speed of the object relative to the subject vehicle Ma. The millimeter-wave radar generates, as observation data, for example, data indicating the reception intensity and the relative speed for each detection direction and distance, or data indicating the relative position and reception intensity of a detected object. LiDAR is a device that generates three-dimensional point cloud data indicating the positions of reflection points in each detection direction by irradiating field with laser light. LiDAR may also be called as a laser radar. LiDAR may be a scan type or a flash type. The sonar is a device that detects the relative position and relative speed of an object with respect to its subject vehicle Ma by transmitting ultrasonic waves in a predetermined direction and analyzing the received data of the reflected wave that is a reflection of the transmitted wave reflected by the object and returned.

Figure 3:
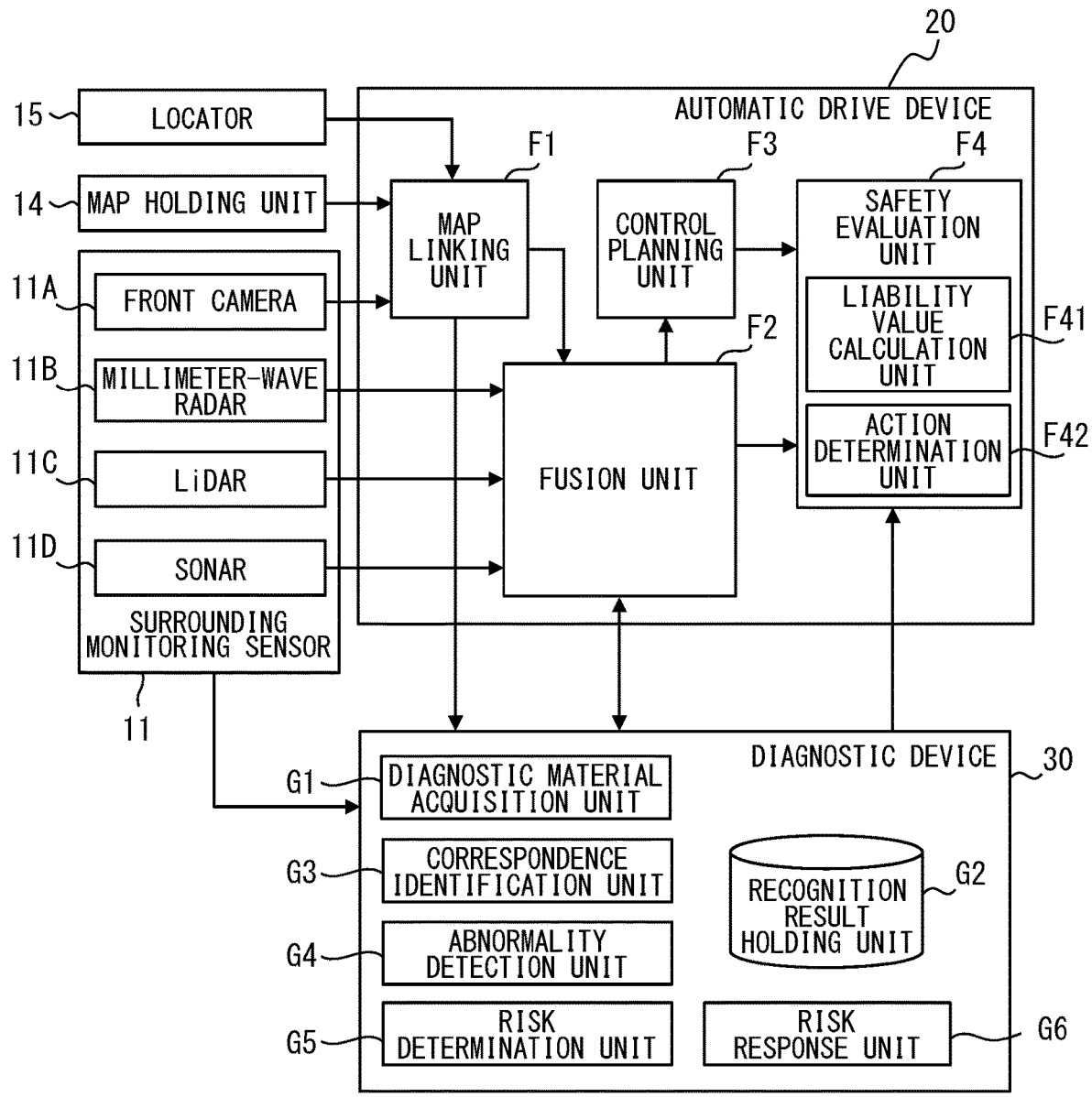
FIG. 3 is a block diagram for explaining functions of an automatic drive device 20 and a diagnostic device 30.

In FIG. 3, the surrounding monitor sensor 11 includes a front camera 11A, a millimeter-wave radar 11B, a LiDAR 11C, and a sonar 11D as a surrounding monitoring sensor 11. The front camera 11A, the millimeter-wave radar 11B, the LiDAR 11C, and the sonar 11D are all configured to include a traveling direction of the vehicle (for example, a front/forward direction of the vehicle) in a detection range. Note that a sonars 11D may be arranged on a front bumper and a rear bumper of the vehicle.

The front camera 11A, LiDAR 11C, or the like detects the above-mentioned detection target by using a classifier using, for example, a CNN (Convolutional Neural Network) or a DNN (Deep Neural Network). The millimeter-wave radar 11B and sonar 11D detect the above-mentioned detection target by analyzing the intensity of the received, reflected wave, the distribution of detection points, and the like.

Each of the surrounding monitoring sensors 11 outputs a signal indicating the relative position, type, moving speed, etc. of each detected object as a detection result. The recognition result of the type of the detected object includes likeliness of the recognition result, that is, a correct recognition probability data indicating that the recognition of the type of the detected object is correct to what degree/extent. For example, the correct recognition probability data includes a probability value that the detected object is a vehicle, a probability value that the detected object is a pedestrian, a probability value that the detected object is a cyclist, a probability value that the detected object is a three-dimensional structure such as a signboard and the like. The probability value for respective types can be treated as a score indicating the degree of matching of characteristics value. Note that the cyclist here refers to a bicycle on which a rider is riding, or a rider on the bicycle. The detection result of the surrounding monitoring sensor 11 can be considered as a recognition result or an identification result.

Further, each of the surrounding monitoring sensors 11 outputs an error signal to an in-vehicle network Nw when an internal failure or the like occurs. For example, the front camera 11A outputs an error signal when it detects an abnormality in the image sensor or a processing circuit. The error signal output by the surrounding monitoring sensor 11 is input to, for example, the automatic drive device 20 and/or to the diagnostic device 30.

Note that the type of sensor used by the vehicle control system 1 as the surrounding monitoring sensor 11 may be appropriately designed, and it is not necessary to include all the above-mentioned sensors. Further, the object recognition processing based on the observation data generated by the surrounding monitoring sensor 11 may be performed by an ECU (Electronic Control Unit) outside the sensor such as the automatic drive device 20. The automatic drive device 20 may provide a part or all of object recognition functions included in the surrounding monitoring sensor 11 such as the front camera 11A and the millimeter-wave radar. In such case, the various surrounding monitoring sensors 11 may provide observation data such as image data and ranging data to the automatic drive device 20 as detection result data.

Returning briefly to FIG. 2, the vehicle state sensor 12 is a group of sensors that detects a state amount related to travel control of the subject vehicle Ma. The vehicle state sensor 12 includes a vehicle speed sensor, a steering sensor, an acceleration sensor, a yaw rate sensor, and the like. The vehicle speed sensor detects a vehicle speed of the subject vehicle. The steering sensor detects a steering angle of the subject vehicle. The acceleration sensor detects accelerations such as front-rear acceleration and lateral acceleration of the subject vehicle. The acceleration sensor may also detect deceleration, which is acceleration in the negative direction/value. The yaw rate sensor detects an angular speed of the subject vehicle. The type of sensor used by the vehicle control system 1 as the vehicle state sensor 12 may be appropriately designed, and it is not necessary to include all the above-mentioned sensors.

The V2X vehicle-mounted device 13 is a device in the subject vehicle Ma for performing wireless communication with other devices. The V2X vehicle-mounted device 13 includes a wide area communication unit and a narrow area communication unit as communication modules. The wide area communication unit is a communication module for performing wireless communication conforming to a predetermined wide area wireless communication standard. As the wide area wireless communication standard here, various standards such as LTE (Long Term Evolution), 4G, and 5G can be adopted. In addition to communication via a wireless base station, the wide area communication unit may be configured to perform wireless communication directly with other devices, i.e., without going through a base station, by a method compliant with the wide area wireless communication standard. That is, the wide area communication unit may be configured to perform cellular V2X. The subject vehicle Ma becomes a connected car that can be connected to the Internet by mounting the V2X vehicle-mounted device 13. For example, the automatic drive device 20 downloads the latest partial map data according to the current position of the subject vehicle Ma from the external server Sv in cooperation with the V2X vehicle-mounted device 13. Further, the V2X vehicle-mounted device 13 acquires traffic congestion information and weather information from the external server Sv, a roadside unit, and the like. The traffic congestion information includes location information such as a start point and an end point of the traffic congestion.

The narrow-area communication unit included in the V2X vehicle-mounted device 13 is a communication module for directly communicating with other device, i.e., other moving objects and roadside units existing around the subject vehicle Ma according to a communication standard (hereinafter, narrow-range communication standard) in which the communication distance is limited to several hundred meters or less. Other moving objects are not limited to vehicles, but may include pedestrians, bicycles, and the like. As the narrow range communication standard, any one such as the WAVE (Wireless Access in Vehicular Environment) standard disclosed in IEEE1709 and the DSRC (Dedicated Short Range Communications) standard can be adopted. For example, the narrow-area communication unit broadcasts vehicle information about its subject vehicle Ma to nearby vehicles at a predetermined transmission cycle, and receives vehicle information transmitted from other vehicle(s). The vehicle information includes a vehicle ID, a current position, a traveling direction, a moving speed, an operating state of a direction indicator, a time stamp, and the like.

The map holding unit 14 is a device that stores partial map data corresponding to the current position of the subject vehicle Ma, which is acquired by the V2X vehicle-mounted device 13 from the external server Sv. The map holding unit 14 holds, for example, partial map data relating to a road on which the subject vehicle Ma is scheduled to pass within a predetermined time. The map holding unit 14 is a non-transitional storage medium. The map holding unit 14 may be realized by using, for example, a part of the storage area included in a storage 23 or a RAM 22 which are described later with reference to FIG. 2. The map holding unit 14 may be provided as a device that is built-in in the automatic drive device 20. The process of acquiring map data from the external server Sv in cooperation with the V2X vehicle-mounted device 13 and storing the data in the map holding unit 14 may be controlled by the automatic drive device 20 or may be controlled by the locator 15. Note that the map holding unit 14 may be a non-volatile storage device that stores all map data.

The locator 15 is a device that generates highly accurate position information and the like of the subject vehicle Ma by combined positioning that combines a plurality of pieces of information. The locator 15 is configured using, for example, a GNSS receiver. The GNSS receiver is a device that repeatedly and/or intermittently detects the current position of the GNSS receiver by receiving a navigation signal (hereinafter referred to as a positioning signal) transmitted from a positioning satellite constituting a GNSS (Global Navigation Satellite System). For example, if the GNSS receiver can receive positioning signals from four or more positioning satellites, it outputs a positioning result every 100 milliseconds. As the GNSS, GPS, GLONASS, Galileo, IRNSS, QZSS, Beidou or the like can be adopted.

The locator 15 repeatedly and/or intermittently identifies the position of the subject vehicle Ma by combining the positioning result of the GNSS receiver and the output of the inertia sensor. For example, when the GNSS receiver cannot receive the GNSS signal, such as in a tunnel, the locator 15 performs dead reckoning (that is, autonomous navigation) using the yaw rate and the vehicle speed. The yaw rate used for dead reckoning may be one calculated by a front camera using SfM technology or may be detected by a yaw rate sensor. The locator 15 may perform dead reckoning using the output of the acceleration sensor or the gyro sensor. The vehicle position is represented, for example, in three-dimensional coordinates of latitude, longitude, and altitude. The vehicle position information provided by the locator 15 is output to the in-vehicle network Nw and used by the automatic drive device 20 and the like.

The locator 15 may be configured to be capable of performing localization process. The localization process is a process performed by collating/comparing the coordinates of a landmark identified based on the image captured by the in-vehicle camera such as the front camera 11A with the coordinates of the landmark registered in the map data to obtain a precise position of the subject vehicle Ma. Further, the locator 15 may be configured to identify a traveling lane ID which is an identifier of a lane in which the subject vehicle Ma is traveling based on the distance from the road edge detected by the front camera or the millimeter-wave radar. The traveling lane ID indicates, for example, the number of lanes from the leftmost or rightmost road edge in which the subject vehicle Ma is traveling. The automatic drive device 20 may have some or all of the functions provided by the locator 15.

The travel control actuator 16 is a traveling actuator. The travel control actuator 16 includes, for example, a brake actuator as a braking device, an electronic throttle, a steering actuator, and the like. The steering actuator includes EPS (Electric Power Steering) motors. The travel control actuator 16 is controlled by the automatic drive device 20. Note that the automatic drive device 20 and the travel control actuator 16 may have, interposed therebetween, a steering ECU for performing steering control as well as a power unit control ECU, a brake ECU and the like for performing acceleration/deceleration control.

The automatic drive device 20 is an ECU (Electronic Control Unit) that performs a part or all of the driving operation on behalf of an occupant in a driver's seat by controlling the travel control actuator 16 based on the detection result of the surrounding monitoring sensor 11. Here, as an example, the automatic drive device 20 is configured to be capable of performing up to the automation level 5, and is configured to be capable of switching an operation mode corresponding to the respective automation levels. Hereinafter, for convenience, the operation mode corresponding to the automatic operation level N (N=0 to 5) will also be referred to as a level N mode. In the following, the description will be continued assuming the case of operating in the mode of automation level 3 or higher. In the level 3 operation mode or higher, the automatic drive device 20 automatically steers, accelerates, and decelerates (in other words, causes brake) the vehicle so that the vehicle Ma travels along the road to the destination set by the driver's seat occupant or the operator. Note that the switching of the operation mode is automatically performed due to the system limit, the exit from the ODD, and the like, in addition to the user operation.

The automatic drive device 20 is mainly composed of a computer including a processing unit 21, the RAM 22, the storage 23, a communication interface 24, a bus connecting them, and the like. The processing unit 21 is hardware for arithmetic processing combined with the RAM 22. The processing unit 21 is configured to include at least one arithmetic core such as a CPU (Central Processing Unit). The processing unit 21 executes various processes for realizing the functions of each of functional units, which will be described later, by accessing the RAM 22. The storage 23 is configured to include a non-volatile storage medium such as a flash memory or the like. The storage 23 stores a program (hereinafter, an automatic driving program) executed by the processing unit 21. Executing the automatic driving program by the processing unit 21 corresponds to executing a method corresponding to the automatic driving program as a vehicle control method. The communication interface 24 is a circuit for communicating with other device(s) via the in-vehicle network Nw. The communication interface 24 may be realized by using an analog circuit element, an IC, or the like.

The communication interface 24 corresponds to, for example, a configuration for acquiring a detection result (that is, sensing information) as an output signal of the surrounding monitoring sensor 11 and a detection result of the vehicle state sensor 12. The sensing information includes the positions of other moving objects, feature objects, obstacles, etc. existing around the subject vehicle Ma, the moving speed and the like. For example, a distance between a front vehicle, which is a vehicle traveling in front of the subject vehicle Ma, and the subject vehicle Ma, and a moving speed of the front vehicle are included in the sensing information. The vehicle in front here may include a vehicle traveling in the same lane as the subject vehicle, that is, a so-called preceding vehicle, and a vehicle traveling in an adjacent lane. That is, the front here is not limited to the direction right in front of the subject vehicle Ma, but an oblique front can be included. The sensing information includes the lateral distance to the road edge, the traveling lane ID, the amount of offset from a center line of the traveling lane, and the like.

The automatic drive device 20 receives various inputs, such as signals indicating the traveling speed, acceleration, yaw rate, etc. of the subject vehicle Ma from the vehicle state sensor 12, subject vehicle position information detected by the locator 15, and map data held in the map holding unit 14. Further, the traffic information acquired by the V2X vehicle-mounted device 13 from the roadside unit or the like and the other vehicle information acquired by the inter-vehicle communication are also input thereto. Details of the operation of the automatic drive device 20 based on these input signals will be described later.

The diagnostic device 30 is configured to detect an abnormality in a field recognition system based on the output signal from the surrounding monitoring sensor 11 and the output signal of the automatic drive device 20. The field recognition system here also includes individual surrounding monitoring sensors 11. Further, the field recognition system also includes a module such as a fusion unit F2 described later, which performs a process of recognizing the environment around the subject vehicle based on the output signal of the surrounding monitoring sensor 11 in the automatic drive device 20. The recognition of the travel environment here includes recognizing the type and position of objects existing around the vehicle.

The diagnostic device 30 is mainly composed of a computer including a processing unit 31, a RAM 32, a storage 33, a communication interface 34, a bus connecting them, and the like. The storage 33 stores a program (hereinafter referred to as a vehicle control program) executed by the processing unit 31. Executing the vehicle control program by the processing unit 31 corresponds to performing a method corresponding to the vehicle control program as the vehicle control method.

Note that the diagnostic device 30 receives inputs from various devices, i.e., detection results output by various surrounding monitoring sensors 11, and error signals, as well as data indicating an operation situation of the fusion unit F2 included in the automatic drive device 20, and the like. The data indicating the operation situation of the fusion unit F2 or the like includes, for example, the result of fusion, the utilization rate (in other words, weight) of the surrounding monitoring sensor 11 used for a sensor fusion, and the like.

Further, the diagnostic device 30 outputs a signal indicating the diagnosis result to the automatic drive device 20. The signal indicating the diagnosis result includes the availability of various surrounding monitoring sensors 11. Further, when there is an abnormality in the recognition system, a control signal corresponding to the degree of influence of the abnormal event is output to the automatic drive device 20. Details of the diagnostic device 30 will be described later. The diagnostic device 30 corresponds to a vehicle control device.

<Configuration of the Automatic Drive Device 20 and the Diagnostic Device 30, FIG. 3>

Here, the configurations of the automatic drive device 20 and the diagnostic device 30 will be described with reference to FIG. 3. The automatic drive device 20 includes a map linking unit F1, the fusion unit F2, a control planning unit F3, and a safety evaluation unit F4 as functional units realized by the processing unit 21 (in FIG. 2) executing an automatic driving program. Further, the diagnostic device 30 has a diagnostic material acquisition unit G1, a recognition result holding unit G2, a correspondence identification unit G3, an abnormality detection unit G4, a risk determination unit G5 and a risk response unit G6 as functional units realized by the processing unit 31 executing a vehicle control program.

The map linking unit F1 recognizes the environment around the vehicle by combining the recognition result of the front camera 11A and the map data. For example, the position and type of structures and road markings existing in front of the subject vehicle are corrected. The map data is used to increase or correct the reliability and the amount of information of the recognition result by the front camera 11A. Further, the map linking unit F1 identifies the position of the subject vehicle on the map by comparing the structure as a landmark shown in the map data with the landmark information recognized by the front camera 11A, which is known as so-called localization process.

The map linking unit F1 outputs recognition result data identified by complementarily/compensatingly using the recognition result by the front camera 11A and the map data to the diagnostic device 30 and the fusion unit F2. For convenience, the map linking unit F1 is also described as a first recognition unit because it corresponds to a configuration in which preprocessing for the fusion unit F2 is performed, and the recognition result by the map linking unit F1 is also described as a first recognition result. Object recognition result data as the first recognition result includes information indicating the position and type of each detected object. As described above, the type information of the detected object includes the correct recognition probability data for each type. For example, the correct recognition probability data includes a probability value that the detected object is a vehicle, a probability value that the detected object is a pedestrian, and the like.

Further, the map linking unit F1 outputs sensor usage ratio data for each detected object to the diagnostic device 30 and the fusion unit F2. The sensor usage ratio data for a certain object indicates a weight of the recognition result of the front camera 11A and a weight of the map data respectively used for determining the type of the object. The sensor usage ratio may be a constant value or may be variable according to the distance from the vehicle to the detected object. Further, it may be changed according to the type of the object recognized by the front camera 11A and the correct recognition probability thereof. In addition, the sensor usage ratio may be changed according to the driving scene. For example, when the image recognition performance could possibly deteriorate, such as at night or in the rain, the weight for the recognition result by the front camera 11A is set to be relatively small. In addition to the above, the driving scene in which the image recognition performance could possibly deteriorate may include a case where a sinking, sunset sun is shining/glaring, a vicinity of the tunnel entrance/exit, the driving on a curve, a case where fog is generated, and the like.

In the present embodiment, the map linking unit F1 is arranged outside the fusion unit F2. However, the fusion unit F2 may have the function of the map linking unit F1. The output signals of the front camera 11A and the locator 15 as well as the map data may directly be input to the fusion unit F2. The map linking unit F1 is an arbitrary element. The map linking unit F1 and the fusion unit F2 correspond to a recognition unit.

The fusion unit F2 recognizes the travel environment of the subject vehicle Ma by the sensor fusion process that integrates the detection results of the various surrounding monitoring sensors 11 with a predetermined weight (in other words, the sensor usage ratio). The travel environment includes not only the position, type, and moving speed of objects existing around the vehicle, but also the curvature of the road, the number of lanes, the traveling lane as the traveling position on the road, the weather, the road surface condition and the like. The weather and the road surface condition can be identified by combining the recognition result of the front camera 11A and the weather information acquired by the V2X vehicle-mounted device 13. The road structure is identified mainly based on the information input from the map linking unit F1.

The data showing the recognition result of the fusion unit F2 is also described as fusion result data in order to distinguish it from the recognition result of the map linking unit F1. For example, the fusion unit F2 generates fusion result data by integrating the detection results of the map linking unit F1, the millimeter-wave radar 11B, the LiDAR 11C, and the sonar 11D by predeterminedly- or dynamically-set sensor usage ratios. The fusion result data is output to the diagnostic device 30, the control planning unit F3, and the safety evaluation unit F4.

The fusion result data also contains information indicating the location and type of each detected object. For example, the fusion result data includes the type, position, shape, size, relative speed, etc. for each detected object. As described above, the type information includes the correct recognition probability data for each type. Note that the fusion unit F2 is configured to perform object recognition processing again/independently by using the recognition processing result of the map linking unit F1 serving as the first recognition unit, thereby designatable as a secondary recognition unit. Therefore, the recognition result by the fusion unit F2 is also described as a secondary recognition result. In the fusion result data, the recognition result in the fusion unit F2 is also described as a secondary recognition result. Hereafter, secondary recognition result data can be referred to as the fusion result data.

The fusion unit F2 also outputs the sensor usage ratio data for each detected object to the diagnostic device 30, the control planning unit F3, and the safety evaluation unit F4. As described above, the sensor usage ratio data for a certain object indicates the weights for respective information sources used for determining the type of the object. The information source here corresponds to a surrounding monitoring sensor 11 such as a millimeter-wave radar 11B, LiDAR 11C and the like. Further, the map linking unit F1 also corresponds to an information source for the fusion unit F2. The map linking unit F1 also recognizes an object existing around the vehicle based on the recognition result of the front camera 11A. Therefore, the map linking unit F1 can be included in the concept of the surrounding monitoring sensor 11.

The sensor usage ratio in the fusion unit F2 may be a constant value or may be variable according to the distance from the vehicle to the detected object. The sensor usage ratio in the fusion unit F2 may be set to a value according to the correct recognition probability that is output by each surrounding monitoring sensor 11. For example, the weight of the surrounding monitoring sensor 11 having a correct recognition probability of 80% may be set to 0.8 (corresponding to 80%). The usage ratio of the surrounding monitoring sensor 11 to recognize a certain object may be a value obtained by multiplying the correct recognition probability of the surrounding monitoring sensor 11 by a predetermined conversion coefficient. Further, it may be changed according to the type of the object. Further, the sensor usage ratio may be changed according to the driving scene. In addition, the sensor usage ratio may be changed for each object detection target item. The detection target items include distance, horizontal azimuth, height azimuth, moving speed, size, type, and the like. For example, with respect to the distance, the height azimuth, and the moving speed, the weight of the millimeter-wave radar 11B or LiDAR 11C may be greater than that of the map linking unit F1 based on the detection result of the front camera 11A. Further, regarding the type and the horizontal azimuth, the weight of the LiDAR 11C or the map linking unit F1 may be greater than that of the millimeter-wave radar 11B.

The control planning unit F3 uses the map data and the recognition result of the fusion unit F2 to generate a travel plan, or a control plan, for an autonomous travel of the subject vehicle Ma by automatic driving. For example, the control planning unit F3 performs a route search process as a medium- to long-term travel plan to generate a recommended route for directing the vehicle from the position of the subject vehicle to the destination. In addition, the control planning unit F3 generates, as short-term control plans for a travel according to the medium/long-term travel plan, a lane change driving plan, a driving plan for traveling the center of the lane, a travel plan for following a preceding vehicle, a travel plan for following the preceding vehicle, a travel plan for avoiding obstacles, and the like. The map data is used, for example, to identify an area in which the vehicle can travel based on the number of lanes and the road width, and to set a steering amount and a target speed based on the curvature of the road ahead.

As a short-term control plan, the control planning unit F3 generates, as a travel plan, a route that reserves a certain distance from the recognized traveling lane marking, or a route that keeps the center of a lane, or a route according to a recognized preceding vehicle, or a route along a travel locus of a recognized preceding vehicle, for example. When the traveling lane of the subject vehicle corresponds to (i.e., is included in) a road having a plurality of lanes on both sides of the traffic, the control planning unit F3 may generate a plan candidate for changing lanes to an adjacent lane in the same direction as the traveling lane of the subject vehicle. When the fusion unit F2 recognizes that an obstacle exists in front of the subject vehicle Ma, the control planning unit F3 may generate a travel plan that passes by the side of the obstacle. When the fusion unit F2 has already recognized that an obstacle exists in front of the subject vehicle Ma, the control planning unit F3 may generate, as a travel plan, a deceleration control that stops the vehicle before the obstacle. The control planning unit F3 may be configured to generate a travel plan that is determined as optimal by machine learning or the like.

The control planning unit F3 calculates, for example, one or more plan candidates as candidates for a short-term travel plan. The plurality of plan candidates have different acceleration/deceleration amounts, jerks (i.e., short trips), steering amounts, timings for performing various controls, and the like. That is, the short-term travel plan may include acceleration/deceleration schedule information for speed adjustment on the calculated route. Plan candidates can also be called route candidates. The control planning unit F3 outputs data indicating at least one generated plan candidate to the safety evaluation unit F4.

The safety evaluation unit F4 determines a final execution plan from among the control plans generated by the control planning unit F3 based on the recognition result and the map data in the fusion unit F2, and outputs a control signal according to that plan to the travel control actuator 16. The map data is used for a calculation process of the safety distance based on the road structure and the traffic rule/regulations and for a calculation process of a potential accident liability value. The safety evaluation unit F4 includes a liability value calculation unit F41 and an action determination unit F42 as sub-functions.

The liability value calculation unit F41 corresponds to a configuration for evaluating the safety of the travel plan generated by the control planning unit F3. As an example, the liability value calculation unit F41 evaluates safety based on whether or not a distance between the subject vehicle and the surrounding object (hereinafter referred to as an inter-object distance) is equal to or greater than a safety distance determined by using a mathematical formula model that formulates the concept of safe driving. For example, the liability value calculation unit F41 determines/calculates the potential accident liability value that indicates a degree of liability of the subject vehicle Ma, for each of the candidate plans made by the control planning unit F3, regarding an accident caused during the travel of the subject vehicle Ma along the candidate plans. The potential accident liability value is determined by using, as one of the determining factors, the result of comparison between (i) the inter-vehicle distance between the subject vehicle Ma and the surrounding vehicle(s) and (ii) the safety distance when the subject vehicle Ma travels a road according to the plan candidate.

The lower the liability is, the smaller the potential accident liability value becomes. Therefore, the potential accident liability value becomes smaller as the subject vehicle Ma is "more eagerly/determinedly" driving safely. For example, if the inter-vehicle distance is sufficiently secured, the potential accident liability value becomes a small value. In addition, the potential accident liability value can be a large value when the subject vehicle Ma suddenly accelerates or decelerates.

Further, the liability value calculation unit F41 can set the potential accident liability value to a low value when the subject vehicle Ma is traveling according to the traffic rule/regulations. In other words, whether or not the route complies with the traffic rule(s) at the vehicle position can also be adopted as a determining factor that affects the potential accident liability value. In order to determine whether or not the subject vehicle Ma is traveling according to the traffic rule, the liability value calculation unit F41 can be provided with a configuration for acquiring the traffic rule at the point where the subject vehicle Ma is traveling. The traffic rules of the point where the subject vehicle Ma is traveling may be acquired from a predetermined database, or may be acquired by analyzing the image taken by the camera that captures the surroundings of the subject vehicle Ma and detecting signs, traffic lights, road markings, and the like. Traffic rules may be included in the map data.

The safety distance used by the liability value calculation unit F41 is a parameter that serves as a reference for evaluating the safety between the subject vehicle and the target vehicle, e.g., a preceding vehicle, and is dynamically determined according to the travel environment. The safety distance is set at least based on behavioral information such as acceleration of the subject vehicle Ma. Since various models can be adopted as the calculation method of the safety distance, the detailed description of the calculation method is omitted here. As a mathematical formula model for calculating the safety distance, for example, an RSS (Responsibility Sensitive Safety) model can be used. Further, as a mathematical formula model for calculating the safety distance, SFF (Safety Force Field, registered trademark) can also be adopted. The safety distance includes a safety distance to the preceding vehicle, that is, a safety distance in the longitudinal direction, and a safety distance in the left-right direction, that is, the horizontal/lateral direction. The mathematical formula model described above includes a model for determining these two types of safety distances.

The above-mentioned mathematical formula model does not guarantee an accident-free driving, but, the model guarantees that, as long as an appropriate collision-avoidance action is taken in a situation in which the inter-vehicle distance falls below the safety distance, the subject vehicle is exempted from the liability of an accident. As an example of an appropriate action for collision avoidance here, braking with a reasonable force can be considered. Braking with a reasonable force includes, for example, braking at the maximum deceleration possible for the subject vehicle. The safety distance calculated by the mathematical formula model can be rephrased as a minimum distance that the vehicle should be reserving between the vehicle itself and an obstacle in order to avoid a close encounter of the vehicle to the obstacle.

The action determination unit F42 is configured to determine the final execution plan based on the potential accident liability value calculated by the liability value calculation unit F41 according to one of the plans from among the plurality of control plans. For example, in the action determination unit F42 adopts as the final execution plan, from among the control plans generated by the control planning unit F3, (a) a plan with the smallest potential accident liability value calculated by the liability value calculation unit F41, which will be described later, or (b) a plan in which the potential accident liability value is calculated as an allowable level.

The safety evaluation unit F4 outputs a control signal corresponding to the control plan determined by the action determination unit F42 to the control object, i.e., to the travel control actuator 16 for the control thereof. For example, when deceleration is scheduled, a control signal for achieving the planned deceleration is output to the brake actuator and the electronic throttle.

The diagnostic material acquisition unit G1 acquires information as diagnostic material, or clue, for determining whether or not an abnormality has occurred in any of the field recognition systems, that is, the surrounding monitoring sensor 11, the map linking unit F1, and the fusion unit F2. As the diagnostic material, a signal indicating the detection result of each surrounding monitoring sensor 11, recognition result data of the map linking unit F1, and recognition result data of the fusion unit F2 can be adopted. Further, when an error signal is output from the surrounding monitoring sensor 11, the error signal can also be used as a diagnostic material. Note that determining whether or not an abnormality has occurred corresponds to detecting that an abnormality has occurred. The abnormality here refers to a state in which it (i.e., the sensor 11) is not operating normally due to some kind of malfunction. An abnormal state of the sensor 11 includes a state in which the recognition result is not output due to a failure and a state in which the output signal is stuck (e.g., stay unchanged). The diagnostic material acquisition unit G1 repeatedly and/or intermittently acquire a predetermined type of data that can be used as a diagnostic material from each of the surrounding monitoring sensor 11, the map linking unit F1, and the fusion unit F2. The diagnostic material acquisition unit G1 distinguishes the data acquired from each of those configuration components into respective types of information, and stores it in the recognition result holding unit G2. Further, data of the same type having different acquisition time points are sorted and saved in chronological order so that the latest data is at the top, for example. Various data are configured so that the order of acquisition can be identified, such as adding a time stamp corresponding to the acquisition time. Note that the data that have been saved for a certain period of time may then be sequentially discarded. The diagnostic material acquisition unit G1 corresponds to a recognition result acquisition unit.

The recognition result holding unit G2 is realized by using, for example, a part of the storage area in the RAM 32. The recognition result holding unit G2 is configured to store data acquired within the last 10 seconds, for example. The recognition result holding unit G2 corresponds to a memory for temporarily pooling data as diagnostic material.

The correspondence identification unit G3 associates an object detected at a previous time with an object detected at the next time based on the position and moving speed of the detected object. That is, the correspondence identification unit G3 corresponds to a configuration in which an object once detected is tracked (i.e., tracking of a detected object). Various methods can be used as the object tracking method. For example, the correspondence identification unit G3 estimates the position at the current time based on the position at the previous time and the moving speed for each detected object, and in the current observation data, the one closest to the estimated position can be regarded as the same object. In addition, the correspondence identification unit G3 may also be configured to perform association (in other words, tracking) between the previous and current data as to whether or not they are the same object by using the degree of similarity of the characteristics value of the detected object at those (current/previous) timings. As the characteristics value of the detected object, items such as a color histogram, a size, a reflection intensity, and the like according to the characteristics of each surrounding monitoring sensor 11 can be adopted.

In addition, the correspondence identification unit G3 also associates objects commonly detected by different surrounding monitoring sensors 11 based on the position information of the detected object. For example, if the millimeter-wave radar 11B also detects another vehicle within a predetermined distance from the position where the front camera 11A detects another vehicle, both are considered as the same object. It may be preferable that the same object is given the same detection target ID so as to facilitate tracking over time. The detected object ID is an identifier for identifying the detected object. The identification result of the correspondence identification unit G3 is reflected to the recognition result data stored in the recognition result holding unit G2.

The abnormality detection unit G4 is configured to detect an abnormality in the field recognition system based on the recognition result data or the like stored in the recognition result holding unit G2. Details of the abnormality detection unit G4 will be described later separately. The surrounding monitoring sensor 11 that is determined by the abnormality detection unit G4 as not operating normally will be referred to as an abnormal sensor hereafter. According to the other viewpoint, the abnormality detection unit G4 corresponds to a configuration for determining the presence or absence of an abnormal sensor.

The risk determination unit G5 is configured to determine the degree of risk, or a risk level, based on the presence or absence of an abnormal sensor and the degree of use of the abnormal sensor in the sensor fusion process. Here, as an example, the degree of risk is expressed in three levels from 0 to 2. A risk level 0 corresponds to a non-dangerous state. A risk level 1 corresponds to a state in which it is better to perform control on a safer side than usual. Control on a safer side refers to processing such as increasing the safety distance or transferring operation authority to the user. A risk level 2 indicates a state in which the vehicle should be stopped.

For example, as shown in FIG. 4, when there is no abnormal sensor, the risk level is determined as 0. Further, as shown in FIG. 5, even if an abnormal sensor is present, if the degree of use of the abnormal sensor is less than a predetermined risk determination threshold value, the risk level is determined as 1. As shown in FIG. 6, when the abnormal sensor exists and the degree of use of the abnormal sensor is equal to or higher than the risk determination threshold value, the risk level is determined as 2. A sensor A shown in FIGS. 4 to 6 corresponds to, for example, the front camera 11A or the map linking unit F1. A sensor B is, for example, the millimeter-wave radar 11B, and a sensor C is, for example, the LiDAR 11C. A sensor D is, for example, the sonar 11D. The risk determination threshold value can be, for example, 10%, 25% or the like.

The degree of use of each surrounding monitoring sensor 11 can be, for example, the weight itself of the sensor in the sensor fusion. Further, when a weighting coefficient is different for each object, the degree of use of each surrounding monitoring sensor 11 may be an average value or the maximum value of the weight for each object. Further, the degree of use of the surrounding monitoring sensor 11 may be a ratio of the number of times the recognition result of the target surrounding monitoring sensor 11 for calculation is used in the sensor fusion process within a certain period of time. That is, the degree of use of each surrounding monitoring sensor 11 may be a value over a certain period of time. The degree of use of each surrounding monitoring sensor 11 in the sensor fusion may be, for example, a ratio derived from a division of the number of objects from the detection result of the target surrounding monitoring sensor 11 used for the sensor fusion by the total number of objects detected within a predetermined distance from the vehicle. The surrounding monitoring sensor 11 used in the sensor fusion can be, for example, a sensor having a weight of 25% or more among other sensors. If the weight of the target surrounding monitoring sensor 11 for the calculation is not 0, the sensor may be regarded as being used for sensor fusion and the degree of use may be calculated. Of course, the degree of use may be calculated in consideration of the weight.

In addition, the risk determination unit G5 determines the risk level to 2 when it is determined in the individual diagnosis process described later that the fusion unit F2 is not operating normally. As another aspect, the risk level may be 1 when the fusion unit F2 has an abnormality. In addition, if it is determined that the map linking unit F1 is not operating normally, the risk level may be determined as 1.

The risk response unit G6 is configured to request the safety evaluation unit F4 to perform a vehicle control according to the risk level based on a determination that the risk level is non-zero. The risk response unit G6 requests the safety evaluation unit F4 to perform a predetermined safety action based on a determination that the risk level is 1. The safety action can be, for example, a vehicle control in which the vehicle is gently stopped over 10 seconds to 1 minute. Further, the safety action may be a handover request process. The handover request process corresponds to making a request for taking over the driving operation to a driver's seat occupant or to an operator in conjunction with an HMI (Human Machine Interface) system such as a display. The handover request process can be called a handover request. The safety action may be increasing the safety distance used to calculate the potential accident liability value. The safety action can be, for example, a process of reducing the traveling speed of the vehicle by a predetermined amount from the planned target speed. The safety action corresponds to an action for shifting vehicle behavior to a safer side than usual while maintaining the travel.

Note that a risk level 1 situation is that the surrounding monitoring sensor 11 used in the sensor fusion by a ratio equal to or higher than a predetermined value has an abnormality. That is, the above situation may be rephrased as and correspond to a configuration in which a process for performing a safety action is triggered/invoked based on an abnormality caused in a surrounding monitoring sensor 11 which is used in the sensor fusion by a ratio greater than or equal to a predetermined threshold value.

Further, the risk response unit G6 requests the safety evaluation unit F4 to perform a predetermined emergency action based on a determination that the risk level is 2. The emergency action may be, for example, an MRM (Minimum Risk Maneuver) described below. The specific content of the MRM can be, for example, a process of autonomously driving the vehicle to a safe place and parking the vehicle while issuing an alarm to the surroundings. Safe places include road shoulders with a width equal to or greater than a predetermined value, places designated as emergency evacuation areas and the like. The content of the MRM may be such that the vehicle stops in the lane in which the vehicle is currently traveling with a gentle deceleration. As the deceleration at such maneuver, it may be preferable to adopt a value of 4 [m/s $^\wedge$ 2] or less, such as 2 [m/s $^\wedge$ 2] or 3 [m/s $^\wedge$ 2]. Of course, when it is necessary to avoid a collision with a preceding vehicle or the like, a deceleration exceeding 4 [m/s $^\wedge$ 2] can be adopted. The deceleration at the time of MRM may be dynamically determined and repeatedly and/or intermittently updated in consideration of the traveling speed at the start of MRM and the inter-vehicle distance to the following vehicle within a range that the vehicle can be stoppable in, for example, 10 seconds. Starting MRM corresponds to starting deceleration for an emergency stop.

The above-described configuration is a configuration in which a process of urgently stopping the vehicle is performed based on a determination that the risk level is 2. For example, the risk response unit G6 outputs a signal requesting the safety evaluation unit F4 to perform the MRM. The risk response unit G6 may instruct the control planning unit F3 to generate a plan for implementing the MRM as an emergency action. The signal requesting the emergency action may be output to the control planning unit F3. The risk response unit G6 corresponds to a vehicle stop processing unit that performs a process for stopping the subject vehicle Ma.

<Details of Operation of the Abnormality Detection Unit G4>

Here, a sensor diagnosis process, which is a process of determining whether each of the plurality of surrounding monitoring sensors 11 is operating normally or is in an abnormal state, will be described using a flowchart shown in FIG. 7. The sensor diagnosis process is repeatedly and/or intermittently performed at a predetermined cycle, for example, while a system power for a travel of the vehicle is turned ON or while the automatic driving function is enabled. The cycle with which the process is repeated can be, for example, 200 milliseconds. Note that the system power mentioned here is a source of electric power for the vehicle to travel, and when the vehicle is a gasoline engine vehicle, it refers to a source of ignition electric power. When the vehicle is an electric vehicle or a hybrid vehicle, it refers to a system main relay. The sensor diagnosis process of the present embodiment includes steps S101 to S105 as an example. The sensor diagnosis process is performed for each of the surrounding monitoring sensors 11. Hereinafter, the surrounding monitoring sensor 11 subject to the diagnosis process may also be designated as a diagnosis target sensor.

In step S101, the abnormality detection unit G4 sets (i.e., selects) an arbitrary object detected by the diagnosis target sensor as a target object to be used in the subsequent processing, and proceeds to step S102. In step S102, the abnormality detection unit G4 accesses the recognition result holding unit G2, and acquires a history (in other words, time series data) of the recognition result of the diagnosis target sensor for the target object within the latest predetermined time (e.g., for the last few minutes). The time-series data of the recognition result shows a transition of the correct recognition probability data of each type for the target object. For example, the time-series data of the recognition result shows a transition of the probability that the target object is a vehicle and a transition of the probability that the target object is a pedestrian. A sampling period that defines a reference range of the past recognition result can be, for example, 4 seconds, 6 seconds or the like.

Figure 8:
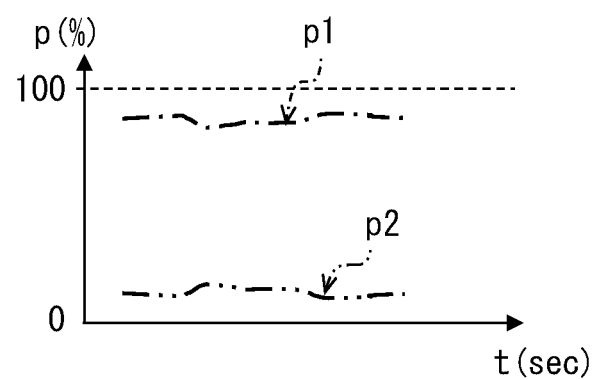
FIG. 8 is a diagram for explaining an operation of the abnormality detection unit G4.
Figure 9:
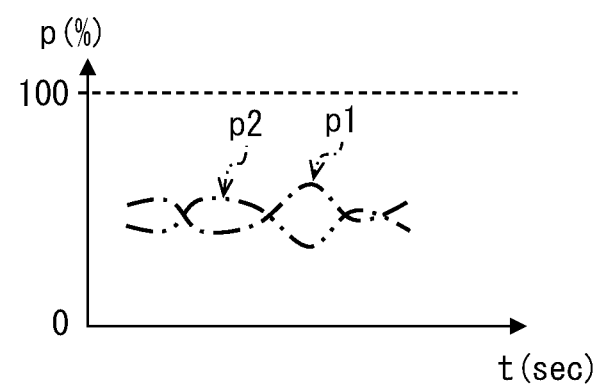
FIG. 9 is a diagram for explaining an operation of the abnormality detection unit G4.

In step S103, the abnormality detection unit G4 determines whether or not the recognition result for the target object is stable based on the time-series data of the recognition result acquired in step S102. For example, when the recognition result for the target object is stable as shown in FIG. 8 (YES in step S103 of FIG. 7), the process proceeds to step S104. In step S104, it is determined that the diagnosis target sensor is highly likely operating normally, and the flow is terminated. On the other hand, as shown in FIG. 9, when the recognition result for the target object fluctuates greatly, that is, when it is unstable (step S103 NO), the process proceeds to step S105, and it is determined that the diagnosis target sensor possibly has an abnormality caused therein. The vertical axis of FIGS. 8 and 9 shows a probability value, and the horizontal axis shows time. A one-dot chain line shows, for example, a transition of a probability value p1 in which the type of the target object is a vehicle, and a two-dot chain line shows, for example, a transition of a probability value p2 in which the type of the target object is a pedestrian. The greater the amplitudes of p1 and p2 and the more frequent high and low switching thereof are, the more unstable the recognition result is. The threshold value of the amplitude of the probability value for each type and the threshold value of high-low switching frequency for determining a possibility of abnormal operation may be appropriately/arbitrarily designed.

The abnormality detection unit G4 performs the above-described processing on all the objects detected by the diagnosis target sensor, and, based on the number of abnormality determinations, which is the number of times it is determined that an abnormality may have possibly occurred, it is finally/conclusively determined whether or not the diagnosis target sensor is operating normally. For example, when the number of abnormality determinations is equal to or greater than a predetermined threshold value, it is determined that an abnormality has occurred in the diagnosis target sensor. Note that the abnormality detection unit G4 may determine that the diagnosis target sensor has an abnormality caused therein when, for example, a ratio of the two counts, i.e., an abnormality determination count over a total determination count (i.e., the sum of the abnormality determination count and a normal operation determination count counting the number of determinations that the sensor is highly likely normally operating), is equal to or greater than a predetermined threshold value. Further, for example, the abnormality detection unit G4 may be configured to perform the above-mentioned diagnosis process not for all the objects detected by the diagnosis target sensor but for a plurality of objects selected randomly or based on a predetermined rule. Further, the abnormality detection unit G4 may perform the above-mentioned diagnosis process only for one object selected at random or based on a predetermined rule, and may determine whether or not the diagnosis target sensor is operating normally. However, if there is only one object used as a diagnostic material, it may risk a faulty determination determining that the surrounding monitoring sensor 11 that is actually operating normally is not operating normally, due to, for example, the characteristics of the object. Therefore, it may be preferable that the abnormality detection unit G4 statistically processes the diagnosis results using a plurality of objects to determine whether or not the diagnosis target sensor is normal or not.

Note that the abnormality detection unit G4 may determine that the surrounding monitoring sensor 11 outputting an error signal has an abnormality caused therein. That is, the surrounding monitoring sensor 11 that outputs an error signal can be regarded as an abnormal sensor.

Figure 7:
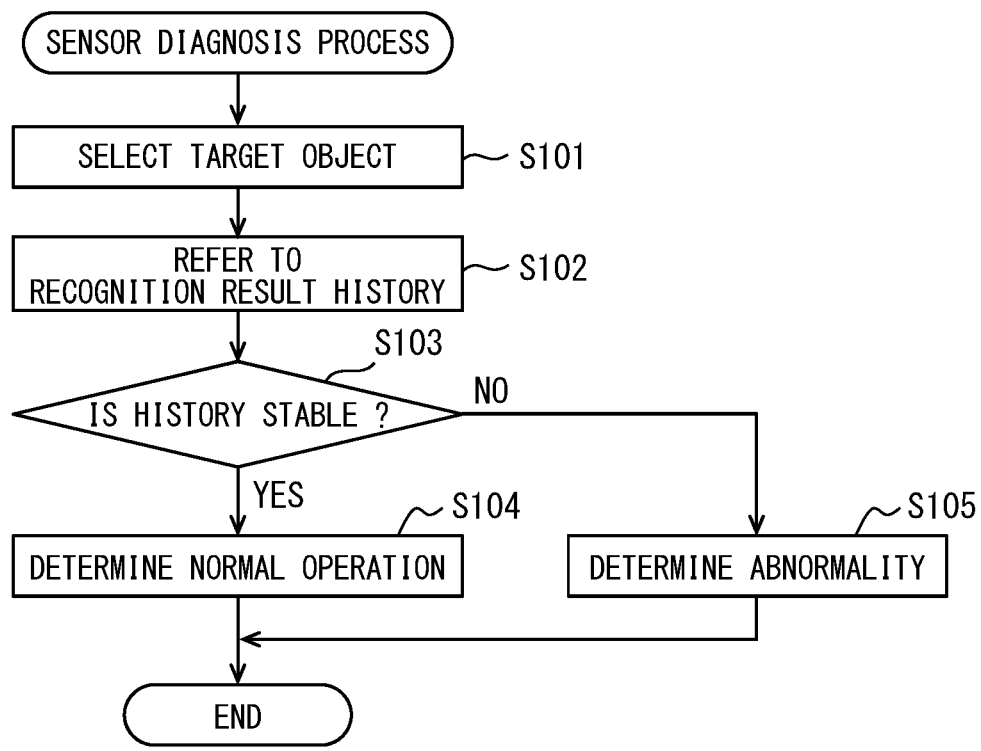
FIG. 7 is a flowchart for explaining an operation of an abnormality detection unit G4.

Further, the abnormality detection unit G4 also performs the same processing as the sensor diagnosis process shown in FIG. 7 for the map linking unit F1 and the fusion unit F2. Thereby, from the viewpoint of the stability of the recognition result, both of the map linking unit F1 and the fusion unit F2 are subject to diagnosis as to whether each of those two units is operating normally. The criteria for determining abnormal operation can be the same as that of the surrounding monitoring sensor 11. Hereinafter, individual elements constituting the field recognition system, such as the surrounding monitoring sensor 11, the map linking unit F1, the fusion unit F2 and the like will be referred to as recognition modules.

<Operation of the Risk Determination Unit G5>

Figure 10:
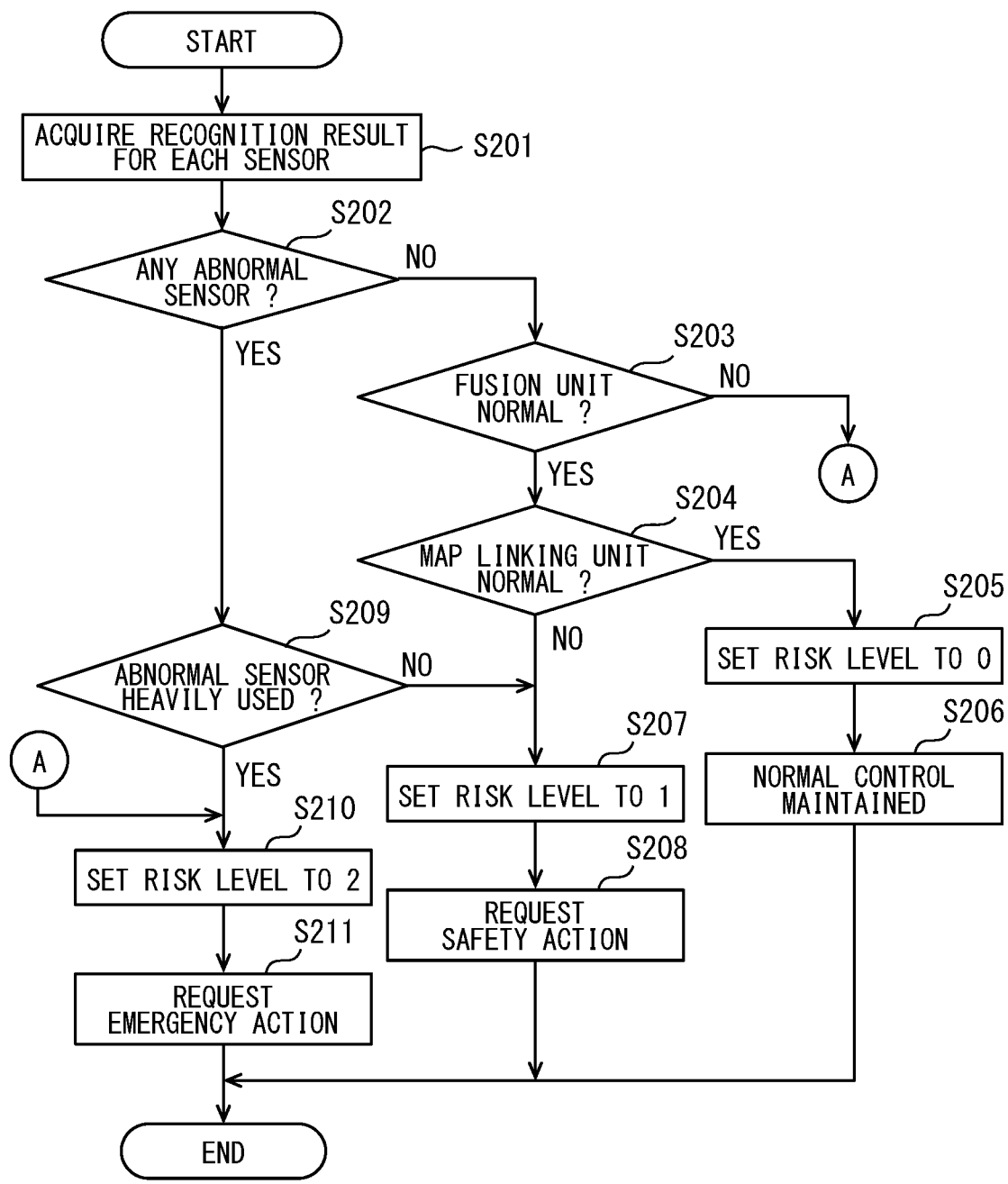
FIG. 10 is a flowchart for explaining an operation of the diagnostic device 30.

The operation of the diagnostic device 30 based on an operating state of each surrounding monitoring sensor 11 will be described with reference to a flowchart shown in FIG. 10. The flowchart shown in FIG. 10 is repeatedly and/or intermittently performed at a predetermined cycle, for example, while the electric power for the travel of the vehicle is turned ON or while the automatic driving function is enabled.

First, in step S201, the diagnosis result for each of the recognition modules is acquired and the process proceeds to step S202. As described above, the recognition module includes each of the surrounding monitoring sensors 11, the map linking unit F1, and the fusion unit F2. Note that the sensor diagnosis process described above may be separately performed for each of the recognition modules as step S201. Step S201 corresponds to an abnormality detection step.

In step S202, it is determined whether or not an abnormal sensor is present or not. If no abnormal sensor is present, a negative determination is made in step S202, and the process proceeds to step S203. If the abnormal sensor is present, an affirmative determination is made in step S202, and the process proceeds to step S209.

In step S203, the abnormality detection unit G4 reads out whether or not the fusion unit F2 is determined as normal. If the abnormality detection unit G4 has already determined that the fusion unit F2 is normal, an affirmative determination is made in step S203, and the process proceeds to step S204. On the other hand, if an abnormality has been detected in the fusion unit F2 by the abnormality detection unit G4, a negative determination is made in step S203, and the process proceeds to step S210.

In step S204, the abnormality detection unit G4 reads out whether or not the map linking unit F1 has been determined as normal. If the abnormality detection unit G4 has determined that the map linking unit F1 is normal, an affirmative determination is made in step S204, and the process proceeds to step S205. On the other hand, when the abnormality detection unit G4 has detected an abnormality in the map linking unit F1, a negative determination is made in step S204, and the process proceeds to step S207.

In step S205, the risk level is set to 0, and the process proceeds to step S206. In step S206, a signal indicating that no abnormality has occurred in the field recognition system is output to the safety evaluation unit F4. In such manner, automatic driving is maintained as normal control.

In step S207, the risk level is set to 1, and the process proceeds to step S208. In step S208, a signal requesting the safety evaluation unit F4 to perform a safety action is output. In such manner, a safety action such as an increase of the safety distance is thus performed.

In step S209, it is determined whether or not the degree of use of (in other words, the degree of dependence on) the abnormal sensor is equal to or higher than a predetermined risk determination threshold value. If the degree of use of the abnormal sensor is equal to or higher than the risk determination threshold value, a positive determination is made in step S209, and the process proceeds to step S210. On the other hand, if the degree of use of the abnormal sensor is less than the risk determination threshold value, a negative determination is made in step S209, and the process proceeds to step S207.

In step S210, the risk level is set to 2 and the process proceeds to step S211. In step S211 a signal requesting the safety evaluation unit F4 to perform an emergency action is output. In such manner, an emergency action such as MRM is thus performed. Since the MRM is a control for safely stopping the vehicle, step S211 corresponds to a stop processing step.

According to the above-described configuration, when an abnormality occurs in the field recognition system, a safety action or an emergency action is adopted/taken. In such manner, it is possible to reduce a possibility that a travel of the vehicle by automatic driving is continued in a situation where the calculation result of the potential accident liability value may possibly be incorrect. In such manner, safety during automatic driving can be improved.

Note that, when the risk level is 1, the diagnostic device 30 may continue the normal control without performing the safety action. This is because, when the risk level is 1, an influence of the abnormal sensor on the recognition result of the travel environment is small, and the control plan using the observation result can be generally performable. Further, as an other aspect, when the risk level is 1, the diagnostic device 30 may be configured to perform an emergency action just like the risk level 2 situation.

<Supplement to Abnormality Detection Unit G4>

As an abnormality detection method, various methods such as a watchdog timer method and a homework answer method can be usable. The watchdog timer method means that, when a watchdog timer of a monitoring device is not cleared by a watchdog pulse input from a monitored device before time-out, it is determined that the monitored device is not normally operating. Here, the abnormality detection unit G4 corresponds to a configuration on the monitoring side, and each of the surrounding monitoring sensors 11, the map linking unit F1, the fusion unit F2, and the like correspond to the monitored device.

<Surrounding Monitoring Sensor 11 Variations>

The vehicle control system 1 may have, as the front camera 11A, a wide-angle, short-range camera for field monitoring, in addition to and separately from the one that is arranged at an upper end of the windshield on a vehicle interior side for a relatively long-range (i.e., distant) image. That is, the front camera 11A may be provided as multiple cameras having different angles of view. For example, three types of cameras, i.e., a medium-range camera, a telephoto camera, and a wide-angle camera, may be provided. A medium-range camera is a camera having an angle of view of about 50 degrees and having a lens or the like configured to capture an image up to, for example, 150 m. A telephoto camera is a camera having a relatively narrow angle of view for capturing a long-distance image farther than the medium-range camera. For example, a telephoto camera has an angle of view of about 30 to 40 degrees and is configured to be capable of capturing a distance of 250 m or more. A wide-angle camera is a camera configured to take a wide image of the surroundings of a vehicle. The wide-angle camera has, for example, an angle of view of about 120 to 150 degrees, and is configured to be capable of capturing an image within 50 m in front of the vehicle.

Further, the vehicle control system 1 may include a rear camera, a right-side camera, a left-side camera, a right-rear radar, and a left-rear radar respectively as the surrounding monitoring sensor 11. The rear camera is a camera that captures a rear view of the vehicle at a predetermined angle of view. The rear camera is arranged at a predetermined position on a back part of the vehicle body, for example, near the rear license plate or the rear window. The right-side camera and the left-side camera are cameras that capture the side view of the vehicle at a predetermined angle of view, and are arranged at predetermined positions on the left and right sides of the vehicle body or the side mirror (for example, near the base of the A pillar). The horizontal angle of view of the right-side camera and the left-side camera may be set to 180°, and the vertical angle of view of those cameras is set to 120°. The right-rear radar is a millimeter-wave radar whose detection range is a predetermined range on the right rear of the vehicle by transmitting an exploration wave toward the right rear of the vehicle, and is installed at, for example, the right corner of the rear bumper. The left-rear radar is a millimeter-wave radar whose detection range is a predetermined range on the left rear of the vehicle by transmitting an exploration wave toward the left rear of the vehicle, and is installed at, for example, the left corner of the rear bumper.

In addition, the position information of obstacles and other vehicles acquired by road-to-vehicle communication and/or vehicle-to-vehicle communication also corresponds to information indicating the environment around the subject vehicle. Therefore, the V2X vehicle-mounted device 13 can also be regarded as one of the surrounding monitoring sensors 11.

<Operation of the Field Recognition System>

The fusion unit F2 determines or detects the position, speed, type, etc. of each of the detected objects by integrating the recognition results of each of the surrounding monitoring sensors 11 with the probability value and the weight of the surrounding monitoring sensors 11. However, the surrounding monitoring sensor 11 may have, depending on the detection method/principle, situations where certain types of object can only be detected or recognized in low accuracy or cannot even be detectable. In view of such circumstances, it may be preferable that the correct recognition probability of the recognition result is corrected and used based on the characteristics of various surrounding monitoring sensors 11, either as a good-at object or a not-good-at object. For example, the field recognition system can be configured as follows.

Figure 11:
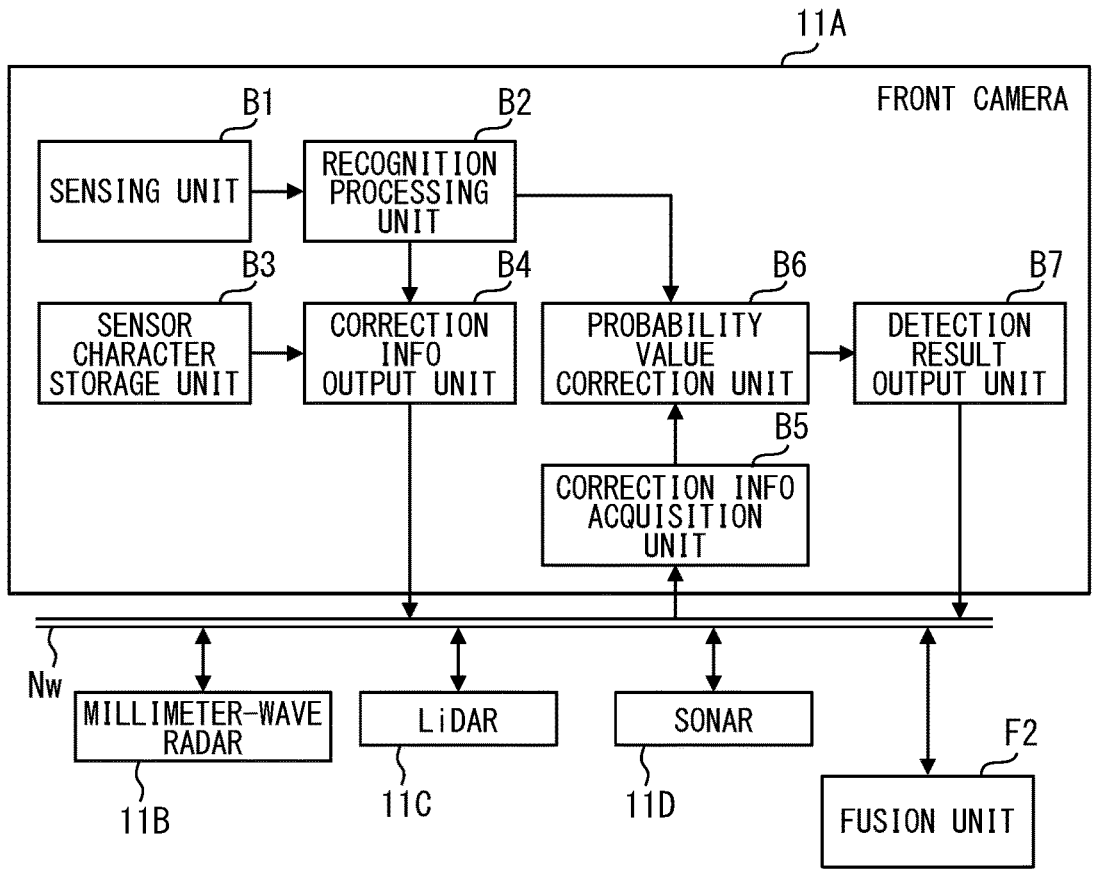
FIG. 11 is a diagram for explaining an operation of a recognition system.

As shown in FIG. 11, each surrounding monitoring sensor 11 has a sensing unit B1, a recognition processing unit B2, a sensor setting storage unit B3, a correction information output unit B4, a correction information acquisition unit B5, a probability value correction unit B6, and a detection result output unit B7. Although each configuration will be described here by taking the front camera 11A as an example, surrounding monitoring sensors other than the front camera 11A, such as the millimeter-wave radar 11B and LiDAR 11C, are also provided with the same functional units. In FIG. 11, the map linking unit F1 and other configurations are not shown.

The sensing unit B1 has a configuration in which observation data used for object recognition processing is generated and output to the recognition processing unit B2. The sensing unit B1 includes a sensor element for generating the observation data. For example, a sensor element for the front camera 11A is an image sensor. For the millimeter-wave radar 11B and the sonar 11D, a configuration including the circuit for receiving the radio wave or the ultrasonic wave as the exploration wave corresponds to the sensing unit B1. In the LiDAR 11C, a configuration including the light receiving element that receives the reflected wave of the irradiated laser light corresponds to the sensing unit B1.

The recognition processing unit B2 has a configuration of recognizing the position, speed, type, etc. of the detected object based on the observation data input from the sensing unit B1. The type is identified based on the characteristics value shown in the observation data. As the characteristics value of the image data, a HOG (Histograms of Oriented Gradients) characteristics or the like can be adopted. Further, in a configuration using radio waves, ultrasonic waves, radar light, etc. as a detection medium, for example, the correlation between the detection distance and the reception intensity, the height, width, contour shape, number of detection points, density of detection points, etc. of the object can be adopted as a characteristics value. The recognition result of the recognition processing unit B2 is output as a signal indicating the position information, type, and the like for each detected object. As described above, the recognition result of the type of the detected object includes the correct recognition probability data indicating the certainty of the recognition result. Also, it includes the correct recognition probability data for each type of the object. For example, the correct recognition probability data indicates a probability value that the detected object is a vehicle, a probability value that the detected object is a pedestrian, a probability value that the detected object is a cyclist, a probability value that the detected object is a three-dimensional structure such as a signboard, and the like.

The sensor setting storage unit B3 is a storage medium that stores sensor position data indicating a mounting position and a detection direction of each surrounding monitoring sensor 11. Further, the sensor setting storage unit B3 registers sensor characteristic data, which is data indicating the characteristics of each surrounding monitoring sensor 11. Such a sensor setting storage unit B3 can also be called a sensor character storage unit. The sensor characteristic data shows, for each of the surrounding monitoring sensors respectively having certain limitation/restriction due to the characteristics of a detection principle of a subject sensor, (a) a not-good-at object that is difficult for the subject sensor to detect (i.e., an object the subject sensor is not good at detecting) and (b) a not-good-at situation in which a detection performance of an object by the subject sensor may deteriorate, for example. It should be noted that the not-good-at objects include objects that are easily mistaken (i.e., mis-detected) as other types of objects and objects whose detection results are not stable.

For example, the sonar 11D is not good at detecting objects that do not easily reflect ultrasonic waves, such as sponge-like objects and net-like objects. In addition, floating structures such as beams, which are structures arranged at a predetermined distance above the road surface and low-profile solid objects provided on the road surface, such as curbs and chock may either be, for example, recognized or not recognized depending on the attitude/position of the vehicle. That is, for the sonar 11D, the floating structure and the low-profile solid object correspond to the detection target object whose detection result is not stable. Note that a floating structure refers to, for example, a three-dimensional object arranged above the road surface by 1 m or more. A low-profile solid object refers to a three-dimensional object whose height is less than a predetermined threshold value (for example, 0.2 m). Further, the sonar 11D may mistakenly recognize the reflection from the road surface as a three-dimensional object such as another vehicle or a wall. That is, sponge-like objects, net-like objects, floating structure, low-profile solid objects, road surfaces, and the like correspond to objects that the sonar 11D is not good at detecting.

In addition, the front camera 11A may not be able to recognize a part of the image frame when the image is overexposed due to backlight, light beam, smear, or the like. In other words, a situation in which a part of the image is overexposed due to backlight, light beam, smear, etc. corresponds to a not-good-at situation.

The LiDAR 11C is not good at detecting black objects. This is because the black object absorbs the laser beam. In addition, it is difficult for the LiDAR 11C to detect a vehicle having a silver body color. The silver body has the property that the aluminum flakes contained in the coating film diffusely reflect light. When such a vehicle is directly in front of the vehicle, it is easily detectable, but when such a vehicle is angled, i.e., diagonally in front or in the rear, the reflection of light changes, thereby the silver-colored vehicle existing diagonally forward or diagonally backward may be an object that the LiDAR 11C is not good at.

Further, the millimeter-wave radar 11B has a lower spatial resolution than the front camera 11A and the LiDAR 11C. Therefore, in case that a plurality of objects are close to each other or a plurality of objects overlap each other, it is difficult for the millimeter-wave radar 11B to detect them as separate objects. That is, the case where a plurality of objects are close to each other or overlap each other corresponds to a situation that the millimeter-wave radar 11B is not good at. In some cases, the millimeter-wave radar 11B recognizes a single object having a complicated shape as two or more objects. That is, an object having a complicated shape is a not-good-at object for the millimeter-wave radar 11B. Further, regarding the millimeter-wave radar 11B, the exploration wave passes under the preceding vehicle, which results in a situation that a vehicle ahead of the preceding vehicle can either be recognized or not. In other words, a vehicle before the preceding vehicle corresponds to a not-good-at object for the millimeter-wave radar 11B. In addition, the millimeter-wave radar 11B may erroneously detect a manhole as a three-dimensional object. Therefore, manholes can also be considered as a not-good-at object for the millimeter-wave radar 11B.

In addition, in any of the surrounding monitoring sensors 11, when an object exists in the vicinity of the sensing unit B1, there may be a case where an object behind a nearby object cannot be recognized due to the shielding by the nearby object. That is, in any of the surrounding monitoring sensors 11, a situation in which an object exists in the vicinity of the mounting position of the sensing unit B1 may correspond to a not-good-at situation. Note that the term "nearby/vicinity" in the present disclosure refers to, for example, a range of 0.3 m or less.

The correction information output unit B4 determines, based on the output signal of the recognition processing unit B2 and the data stored in the sensor setting storage unit B3, whether a not-good-at object or a not-good-at situation for the other sensor which is also a surrounding monitoring sensor 11 is being detected or not. Then, when the not-good-at object/situation that the other sensor is not good at detecting is being detected, the correction information output unit B4 transmits, to the other sensor, i.e., to a not-good-at sensor, predetermined probability value correction information.

The probability value correction information is information for notifying the other sensor of the existence of an object or a situation that the other sensor is not good at detecting. The probability value correction information includes, for example, information indicating the type of not-good-at object or not-good-at situation and its position. Note that the probability value correction information may include a direction in which the not-good-at object or the not-good-at situation exists instead of the position of the not-good-at object or the not-good-at situation. In addition, the probability value correction information may include both the position and direction of the not-good-at object or the not-good-at situation.

For example, when the correction information output unit B4 of the front camera 11A recognizes at least one of a sponge-like object, a net-like object, a floating structure, a low-profile solid object, and a road surface area by image analysis, the correction information output unit B4 outputs the probability value correction information indicating the position or direction at or in which those objects exist to the sonar 11D. Further, when the correction information output unit B4 of the front camera 11A detects a black object by image analysis, the correction information output unit B4 outputs the probability value correction information indicating the direction or position where the black object exists to the LiDAR 11C. Further, when the correction information output unit B4 of the front camera 11A detects that a vehicle exists in front of the preceding vehicle by image analysis, the correction information output unit B4 outputs the probability value correction information to the millimeter-wave radar 11B, indicating the direction or position at or in which a vehicle ahead of the vehicle in front is present.

In addition, each correction information output unit B4 generates and outputs the probability value correction information indicating the position of a nearby object to the other sensor when it is detected that an object exists in the vicinity of the other sensor whose mounting position is different from that of the subject sensor. For example, when the right-side camera detects the presence of a bicycle in the vicinity of the right-rear radar, the right-side camera outputs probability value correction information indicating such a situation to the right-rear radar. Further, when a certain camera is detecting a position of the sun or a light having a predetermined brightness or higher, probability value correction information indicating the position or direction of such light source is output to the camera(s) affected by such light source.

The correction information acquisition unit B5 acquires the probability value correction information addressed to the subject sensor output from the other sensor, and provides it to the probability value correction unit B6. For example, the correction information acquisition unit B5 of the front camera 11A acquires the direction in which the sun, headlights, or the like exist as the probability value correction information from the other camera as an other sensor. Further, for example, the correction information acquisition unit B5 of the sonar 11D acquires, from the front camera 11A and the LiDAR 11C as other sensors, the probability value correction information indicating a area or direction in which sponge-like objects, net-like objects, floating structure, low-profile solid objects, road surface areas, and the like exist.

The probability value correction unit B6 lowers the correct recognition probability of the recognition result of the object with respect to the position or direction in which the not-good-at object or the not-good-at situation exists, based on the probability value correction information acquired by the correction information acquisition unit B5. For example, the front camera 11A lowers the correct recognition probability of the recognition result of an area where there is possibly backlight, smear, light beam, or the like. Further, the sonar 11D lowers the correct recognition probability of the recognition result for the area where the sponge-like object exists, the road surface area, etc., which is detected by the other sensor(s). When receiving a notice of a area where the black object exists as the probability value correction information from the front camera 11A, the probability value correction unit B6 of the LiDAR 11C lowers the correct recognition probability of the recognition result for such area.

Further, the probability value correction unit B6 of the millimeter-wave radar 11B lowers the correct recognition probability of the recognition result in the area where a plurality of objects are close to each other or overlapped, which is detected by the front camera 11A and the LiDAR 11C. Further, for example, when the front camera 11A, the LiDAR 11C, and/or the V2X vehicle-mounted device 13 notify the existence of the vehicle in front of the preceding vehicle, the probability value correction unit B6 of the millimeter-wave radar 11B lowers the correct recognition probability of the recognition result of a target on an extension line of the preceding vehicle. In such manner, the risk of fluctuation of the detection result for the area ahead of the preceding vehicle is reducible. As another aspect, the probability value correction unit B6 of the millimeter-wave radar 11B may raise the correct recognition probability of the recognition result of a target on the extension line of the preceding vehicle when the presence of the vehicle in front of the preceding vehicle is notified from the front camera 11A or the like. This also reduces the risk that the detection result of the millimeter-wave radar 11B will become unstable.

Note that the amount of decrease or increase of the correct recognition probability by the probability value correction unit B6 may be a constant value. For example, the amount of decrease or increase of the correct recognition probability may be 10% or 20%. Further, the amount of decrease of the correct recognition probability may be changed according to the type of the output source of the probability value correction information. The amount of decrease of the correct recognition probability by the probability value correction unit B6 on the receiving side may be changed according to the correct recognition probability for the target object at the output source of the probability value correction information. When the probability value correction information having the same content is acquired from a plurality of other sensors, the amount of decrease may be raised. It may be preferable that the higher the reliability of the probability value correction information is, the greater the amount of decrease is made. If the content notified in the probability value correction information matches the recognition result of the subject sensor, the correct recognition probability of the recognition result of the target area may be raised. The probability value correction unit B6 adopts the output of the recognition processing unit B2 as it is for the recognition result of the position or direction in which the probability value correction information has not been acquired.

The detection result output unit B7 outputs the recognition result generated above, that is, the recognition result of the subject sensor and the data indicating the correct recognition probability to the map linking unit F1 or the fusion unit F2. The fusion unit F2 calculates, finally/decisively, the type and position of the detected object, the moving speed, the acceleration, and the like by integrating the recognition results of the surrounding monitoring sensors 11. It is used for calculating the safety distance for each target as a detected object and for tracking processing.

According to the above-described configuration, when there is a not-good-at object/situation of a certain surrounding monitoring sensor 11, the result of the recognition processing unit B2 of the subject sensor is not adopted as it is, but is adjusted, i.e., based on the probability value correction information from the other sensors, the correct recognition probability of the recognition result is lowered by a predetermined amount. In such manner, the correct recognition probability of the recognition result after integration can be raised. The surrounding monitoring sensor 11 described above corresponds to a configuration in which communication is performed with the other sensors and the correct recognition probability of the recognition result of the subject sensor is lowered and output based on the recognition result of the other sensors.

By the way, in the above, a mode in which the related surrounding monitoring sensors 11 communicate with each other, and the correct recognition probability is corrected by the surrounding monitoring sensor 11, and the corrected probability is output to the fusion unit F2 or the like is disclosed. The idea of the present disclosure is not limited to such form.

Figure 12:
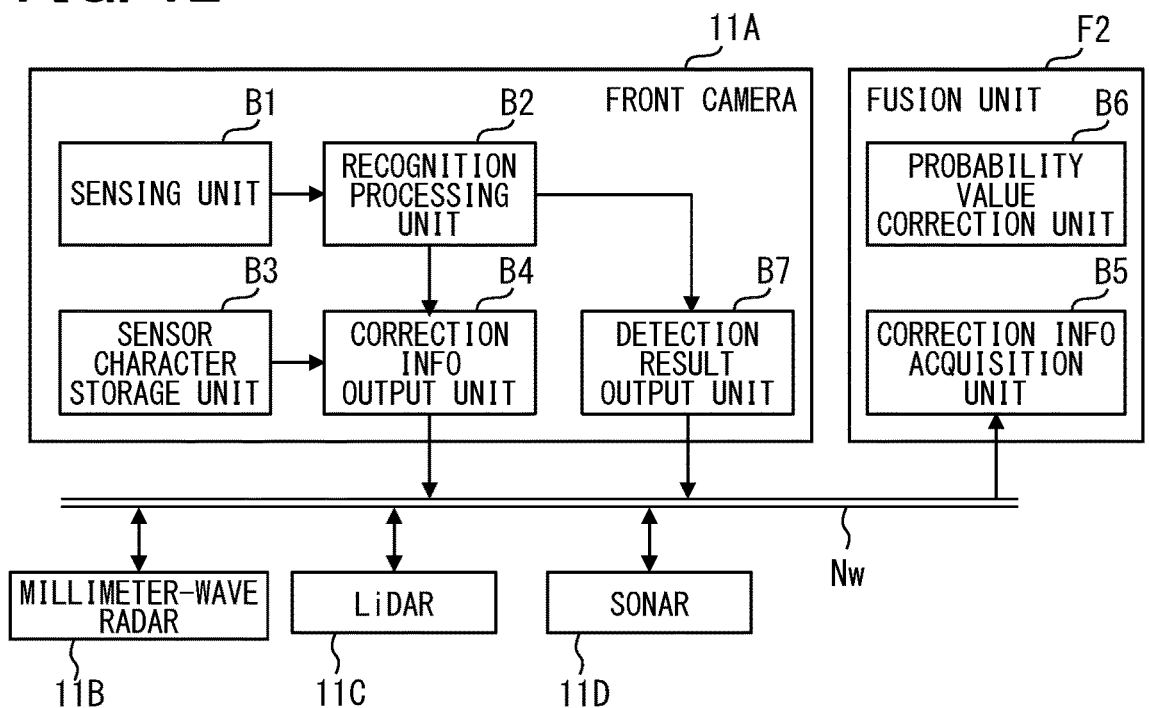
FIG. 12 is a diagram for explaining an operation of the recognition system.

As shown in FIG. 12, each surrounding monitoring sensor 11 does not have to include the correction information acquisition unit F5 and the probability value correction unit B6. Instead, the fusion unit F2 includes a correction information acquisition unit F5 and a probability value correction unit B6. In a configuration example shown in FIG. 12, each surrounding monitoring sensor 11 notifies the fusion unit F2 of the recognition result and the correct recognition probability of the subject sensor. Further, when each surrounding monitoring sensor 11 recognizes a not-good-at object or a not-good-at situation of the other sensor, it outputs probability value correction information including information of the target other sensor to the fusion unit F2.

The probability value correction information here includes identification information (for example, sensor ID) of the other target sensor, a position or direction in which a not-good-at object or a not-good-at situation exists, a type thereof, and the like. The probability value correction unit B6 included in the fusion unit F2 corrects the correct recognition probability of the recognition result for each sensor by using the probability value correction information. According to such a configuration, the fusion unit F2 integrates the detection results of each surrounding monitoring sensor 11 after correcting the correct recognition probability of the recognition result for each sensor using the probability value correction information, thereby increasing the correct recognition probability of the recognition result after integration.

For example, when the fusion unit F2 integrates the recognition results of the sonar 11D and the rear camera, if the rear camera detects a short (i.e., low-profile) object such as a curb or a wheel chock, the recognition result of the sonar 11D for the corresponding, i.e., same, position has lower weight for the integration of the information. In such manner, when the sonar 11D recognizes that there is no three-dimensional object in the corresponding area, risk of deterioration/falsification of the recognition result after integration due to the influence of the recognition result of the sonar 11D is reducible. Further, for example, when the existence of an object in front of a certain surrounding monitoring sensor is detected by another sensor having a different mounting position, the correct recognition probability of the recognition result of the surrounding monitoring sensor 11 that is close to the object is lowered. In such manner, the number of false recognition cases where the recognition result after integration is incorrect is reducible. In addition, when the fusion unit F2 determines that a predetermined amount of snowfall or more is detected by the image sensor or LiDAR, it may consider that there may be a chance that snow has adhered to the sonar and may reduce the weight of the recognition result by the sonar to integrate the information.

The above-described configuration corresponds to a configuration in which, when the first sensor, which is an arbitrary surrounding monitoring sensor, detects an object/situation that the second sensor, which is the other sensor, is not good at detecting, the recognition result of the second sensor is determined as having low reliability based on the detection result. Further, the fusion unit F2 that integrates the sensing information corresponds to a configuration in which the weight of the recognition result of the second sensor is reduced to integrate the sensing information. That is, the fusion unit F2 corresponds to a configuration in which the recognition results of a plurality of surrounding monitoring sensors 11 are integrated, where integration of information is performed by lowering/adjusting the weight of the recognition results of the other sensor(s) based on the recognition results of one sensor. In the configuration in which the weight for each sensor in the sensor fusion is determined based on the correct recognition probability of the recognition result, correcting the correct recognition probability corresponds to correcting the weight for each sensor at the time of performing sensor fusion. The second sensor corresponds to a not-good-at sensor.

The above-described configuration corresponds to a configuration in which, when the first sensor, which is an arbitrary surrounding monitoring sensor, detects an object/situation that the second sensor, which is the other sensor, is not good at detecting, the correct recognition probability of the recognition result of the second sensor is lowered based on the detection result. However, while there are objects/situations that the second sensor is not good at detecting, there also are objects/situations that the second sensor is good at detecting. An object that a certain surrounding monitoring sensor is good at detecting is an object that is easy to detect. A situation that a certain surrounding monitoring sensor is good at detecting means that, in such a situation, the detection accuracy of detected objects does not deteriorate. When the first sensor detects an object/situation that the second sensor is good at detecting, it may be configured to raise the correct recognition probability of the recognition result of the second sensor based on the detection result. Even with such a configuration, the correct recognition probability of the recognition result after integration by the fusion unit F2 can be raised. When increasing the correct recognition probability of the recognition result of the second sensor based on the recognition result of the first sensor, the probability value correction information may be transmitted and received between the sensors or between the sensor and the fusion unit F2. It should be noted that a person skilled in the art can understand a method for realizing a configuration that raises the correct recognition probability of the recognition result of the second sensor based on the recognition result of the first sensor based on the above disclosure, thereby details of such configuration are omitted.

Modification Example of System Configuration

Figure 13:
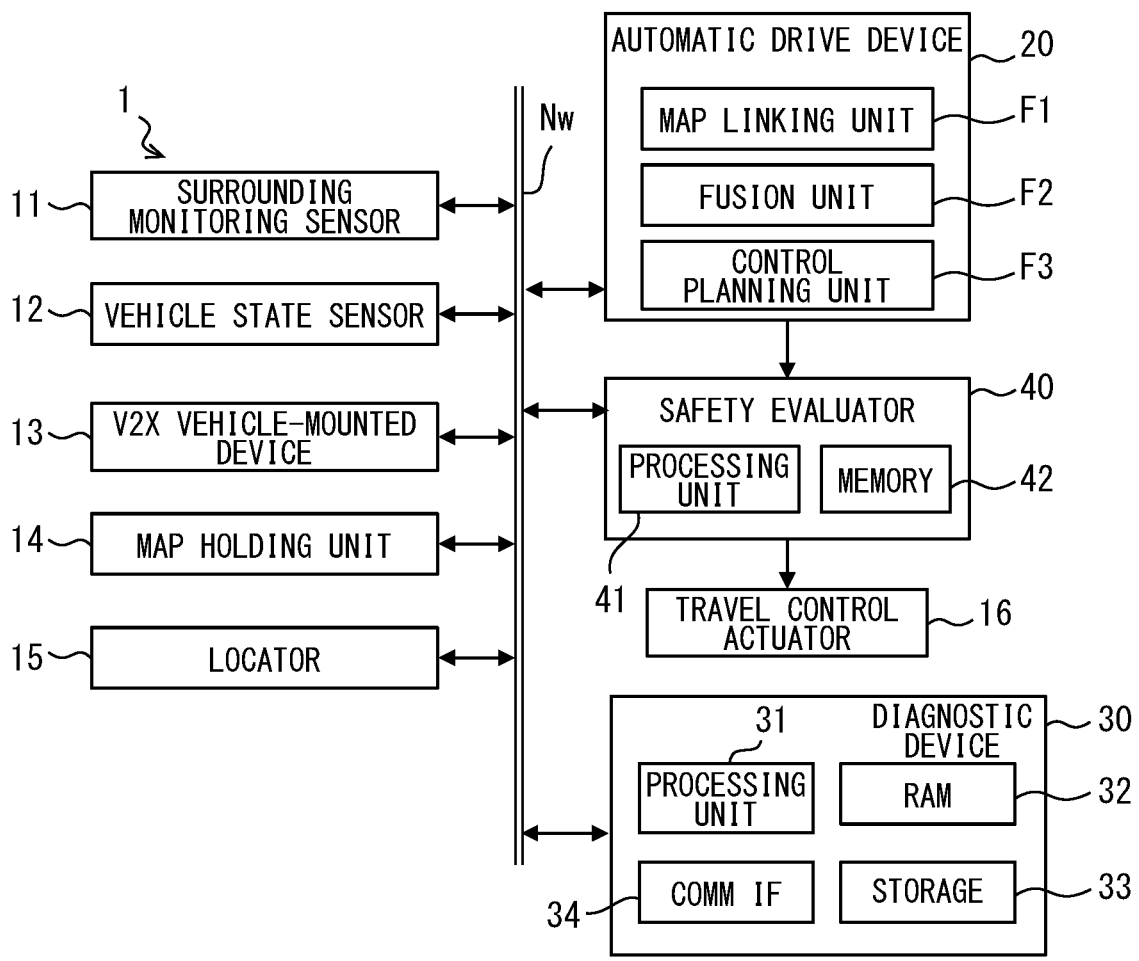
FIG. 13 is a diagram showing a modification of the system configuration.

As shown in FIG. 13, a safety evaluator 40 corresponding to the safety evaluation unit F4 may be provided independently of the automatic drive device 20. The safety evaluator 40 is a module having the same function as the safety evaluation unit F4, and has a configuration in which the final control content is determined based on the potential accident liability value for the control plan generated by the automatic drive device 20. The safety evaluation unit F4 described above and the safety evaluator 40 described above can be switchable with each other for implementing the same functions. The safety evaluator 40 is configured as a computer including a processing unit 41 and a memory 42. The processing unit 41 is configured by using a processor. The memory 42 includes a RAM and a flash memory.

Second Embodiment

The vehicle control system 1 may include a field recognition system for the safety evaluator 40 to calculate a potential accident liability value, in addition to the field recognition system for control planning unit F3 to generate a control plan. That is, the field recognition system may be configured as a dual/duplex system. Hereinafter, a configuration corresponding to such a technical idea will be described with reference to FIGS. 14 and 15 as the second embodiment. In the following, for convenience, the field recognition system for generating the control plan will be referred to as a recognition system for control planning. On the other hand, the field recognition system that generates the recognition result for calculating the potential accident liability value is described as a recognition system for safety evaluation (hereinafter, SE: Safety Evaluation). SE may also be described as SA (Safety Assessment).

Figure 14:
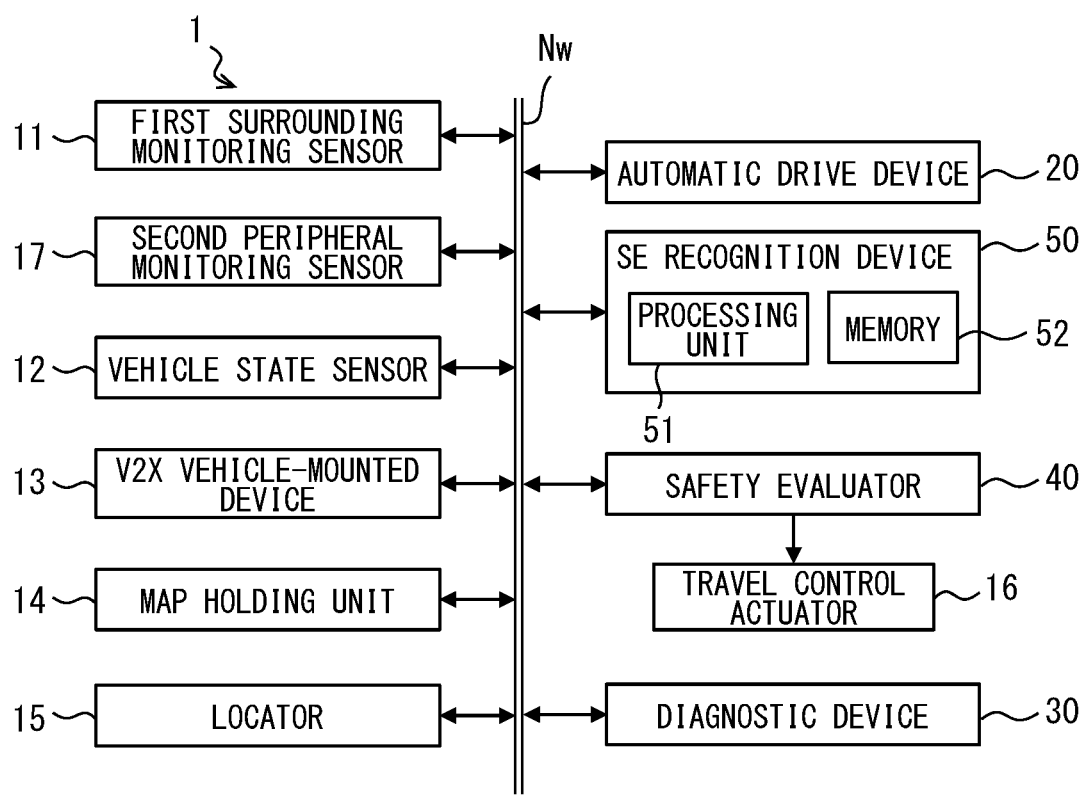
FIG. 14 is a block diagram showing a configuration of the vehicle control system 1 according to a second embodiment.

As shown in FIG. 14, the vehicle control system 1 of the second embodiment includes a second surrounding monitoring sensor 17 in addition to the first surrounding monitoring sensor 11 corresponding to the surrounding monitoring sensor 11 described above. The first surrounding monitoring sensor 11 is the above-mentioned front camera 11A, the millimeter-wave radar 11B, the LiDAR 11C, the sonar 11D, and the like. The first surrounding monitoring sensor 11 is a sensor group used by the automatic drive device 20 including the control planning unit F3. The map linking unit F1 and the fusion unit F2 included in the automatic drive device 20 recognize the travel environment based on the output signal of the first surrounding monitoring sensor 11. The first surrounding monitoring sensor 11, the map linking unit F1, and the fusion unit F2 correspond to a recognition module that constitutes a recognition system for control planning. The map linking unit F1 and the fusion unit F2 correspond to a first recognition unit.

The second surrounding monitoring sensor 17 is, for example, a front camera 17A, a millimeter-wave radar 17B, a LiDAR 17C, a sonar 17D, and the like. The front camera 17A is a sensor physically different/separate from the front camera 11A. The same applies to the millimeter-wave radar 17B, the LiDAR 17C, the sonar 17D, and the like.

For example, while various first surrounding monitoring sensors 11 are sensors mounted on the vehicle body, the second surrounding monitoring sensor 17 can be a group of sensors retrofitted to the roof of the vehicle. The second surrounding monitoring sensor 17 is configured to be attachable to and detachable from the vehicle body as a set for automatic driving, for example. The positions of the first surrounding monitoring sensor 11 and the second surrounding monitoring sensor 17 can be interchanged. That is, the first surrounding monitoring sensor 11 may be a detachable sensor attached to the roof of the vehicle or the like.

Further, the vehicle control system 1 of the second embodiment includes an SE recognition device 50 that recognizes the travel environment based on the output signal of the second surrounding monitoring sensor 17. The SE recognition device 50 is configured as a computer including a processing unit 51 and a memory 52. The processing unit 51 is configured by using a processor such as a GPU, and the memory 52 includes a RAM and a flash memory.

Figure 15:
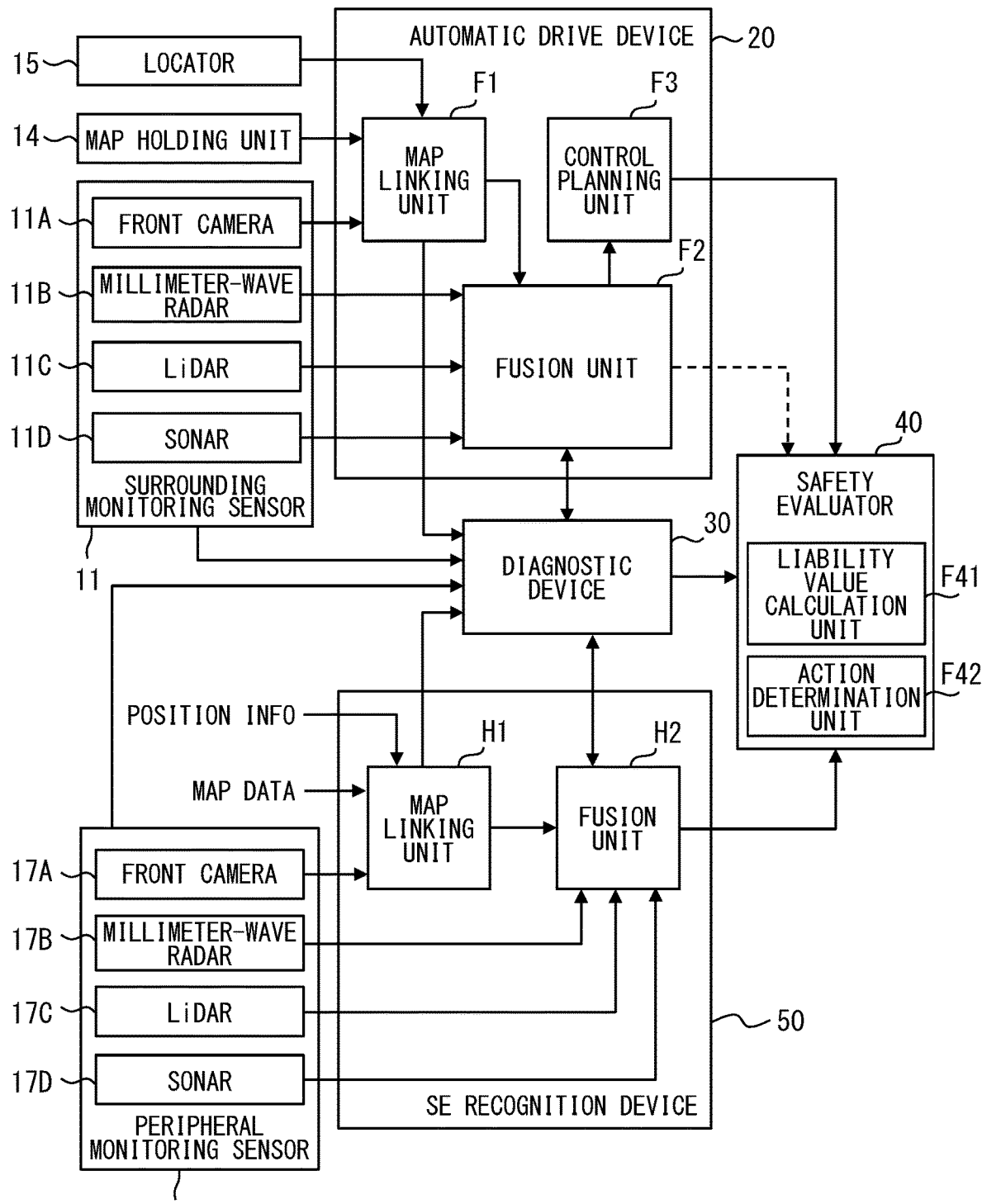
FIG. 15 is a block diagram for explaining an operation of the diagnostic device 30 of the second embodiment.

Similar to the automatic drive device 20, the SE recognition device 50 includes a map linking unit H1 and a fusion unit H2, as shown in FIG. 15. The map linking unit H1 has a configuration in which object recognition is performed based on the recognition result of the front camera 17A and the map data. The map linking unit H1 can be configured to perform the same processing as the map linking unit F1 included in the automatic drive device 20. The fusion unit H2 has a configuration in which object recognition is performed based on the recognition results of all of the map linking unit H1, the millimeter-wave radar 17B, the LiDAR 17C, and the sonar 17D. The fusion unit H2 can also be configured to perform the same processing as the fusion unit F2 included in the automatic drive device 20. The second surrounding monitoring sensor 17, the map linking unit H1, and the fusion unit H2 correspond to a recognition module that constitutes a recognition system for SE. The map linking unit H1 and the fusion unit H2 correspond to a recognition unit and a second recognition unit.

The diagnostic device 30 receives input from various devices, such as the output signal of the second surrounding monitoring sensor 17 and the recognition result of the map linking unit H1 and the recognition result of the fusion unit H2, in addition to the output signal of the first surrounding monitoring sensor 11, the recognition result of the map linking unit F1, and the recognition result of the fusion unit F2, The abnormality detection unit G4 of the diagnostic device 30 also performs the above-mentioned sensor diagnosis process for each of the various second surrounding monitoring sensors 17, the map linking unit H1, and the fusion unit H2. That is, the sensor diagnosis process is also performed for the recognition module constituting the recognition system for SE.

Figure 16:
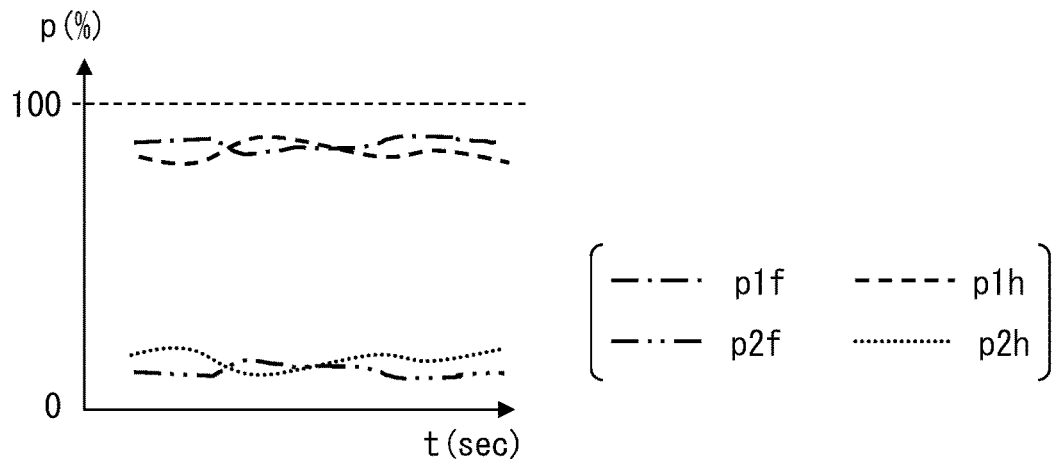
FIG. 16 is a diagram for explaining an operation of the abnormality detection unit G4 of the second embodiment.

Further, the abnormality detection unit G4 detects an abnormality of one of the fusion unit F2 for control planning and the fusion unit H2 for SE by comparing the recognition result of the fusion unit F2 for control planning with the recognition result of the fusion unit H2 for SE. For example, when the recognition result of the fusion unit F2 for control planning and the recognition result of the fusion unit H2 for SE are similar as shown in FIG. 16, it is determined that both are normal. In FIG. 16, the vertical axis shows the probability value, and the horizontal axis shows time. The one-dot chain line and the two-dot chain line show the recognition result of the fusion unit F2 for control planning, and the broken line and the dotted line show the recognition result of the fusion unit H2 for SE. Specifically, the one-dot chain line shows the transition of the probability value plf in the fusion unit F2 for control planning in which the type of the target object is a vehicle, and the two-dot chain line shows the transition of the probability value p2f in the fusion unit F2 in which the type of the target object is a pedestrian. The broken line shows the transition of the probability value plh in the fusion unit H2 for SE in which the type of the target object is a vehicle, and the dotted line shows the transition of the probability value p2h in the fusion unit H2 in which the type of the target object is a pedestrian.

For example, the anomaly detection unit G4 calculates the similarity between the recognition results of predetermined target objects by comparing historical data of the probability values of the recognition results by pattern matching or the like. Then, in case that the similarity of the recognition results is equal to or higher than a predetermined threshold value (for example, 75%), it is determined that both are operating normally. On the other hand, when the recognition results of both are less than a predetermined threshold value or different from each other, the abnormality detection unit G4 determines that an abnormality has occurred in either one of the fusion unit F2 for control planning and the fusion unit H2 for SE. In such case, which one has the abnormality is identified based on the result of the sensor diagnosis process. Determining that the recognition results are similar corresponds to determining the similar recognition results are consistent/matching, or interpreting similarity as consistency and normality.

Figure 17:
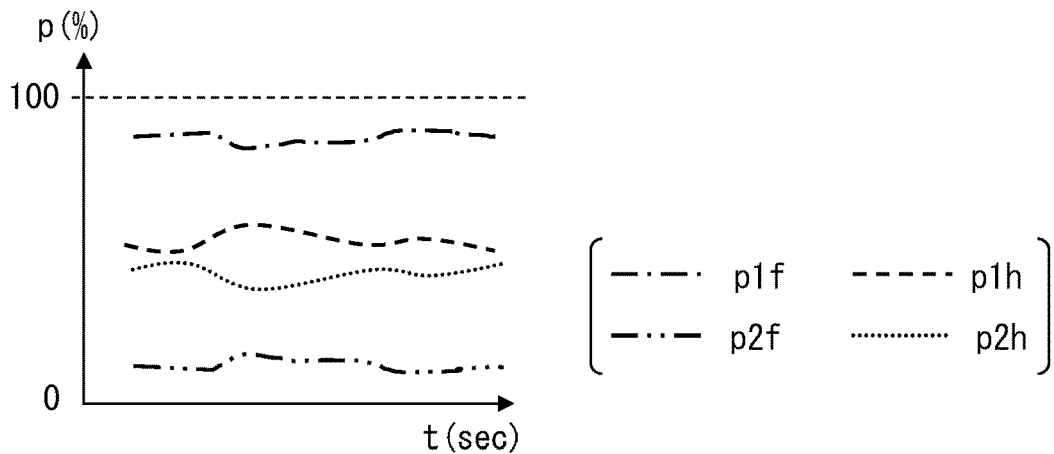
FIG. 17 is a diagram for explaining an operation of the abnormality detection unit G4 of the second embodiment.
Figure 18:
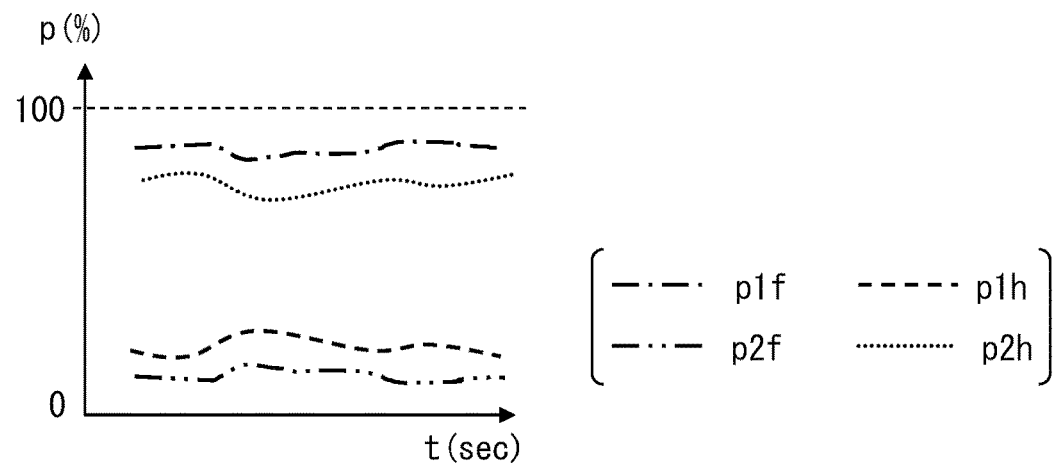
FIG. 18 is a diagram for explaining an operation of the abnormality detection unit G4 of the second embodiment.

Now, in FIG. 17, although the type of the target object is consistent/matching in the recognition results from the fusion unit F2 and the fusion unit H2, the probability values of the two are significantly different from each other, thereby such a pattern in the graph is determined as an abnormality of one of the fusion unit F2 for control planning and the fusion unit H2 for SE. Specifically, although the fusion unit F2 for control planning and the fusion unit H2 for SE both determine that the type of the target object is a vehicle, a pattern in the graph shows that the probability values are different from each other by a predetermined threshold value (for example, 30%) or more. Further, FIG. 18 shows another pattern in the graph, for determining an abnormality of one of the fusion unit F2 for control planning and the fusion unit H2 for SE, in which the type of the target object in the recognition results are different. Specifically, in the above, the fusion unit F2 for control planning determines that the target object is a vehicle, while the fusion unit H2 for SE determines that the target object is a pedestrian. The items indicated by the symbols and line types in FIGS. 17 and 18 are the same as those in FIG. 16.

When the recognition results of the fusion unit F2 for control planning and the recognition results of the fusion unit H2 for SE do not match, that is, when one of them is abnormal, the abnormality detection unit G4 identifies which one has an abnormality based on the result of the sensor diagnosis process.

In the above, the process of detecting an abnormality in one of the fusion unit F2 for control planning and the fusion unit H2 for SE by comparing the recognition results of the fusion unit F2 for control planning and the recognition results of the fusion unit H2 for SE is discussed. Further, the abnormality detection unit G4 performs the same comparison process for the map linking units F1 and H1. That is, the abnormality detection unit G4 detects an abnormality in one of the map linking units F1 and H1 by comparing the recognition results of the map linking unit F1 for control planning and the map linking unit H1 for SE. In such manner, it becomes possible to more accurately determine whether or not an abnormality has occurred in the map linking units F1 or H1. Further, the abnormality detection unit G4 identifies which one of the two has an abnormality based on the result of the sensor diagnosis process, when the recognition results of the map linking unit F1 and the recognition results of the map linking unit H1 for SE are not consistent/unmatching, that is, when either of them is abnormal.

If an abnormality occurs in the recognition system for SE, the diagnostic device 30 may notify the safety evaluator 40 of such situation, while performing calculation of the potential accident liability value by using the recognition result of the fusion unit F2 for control planning. According to such a configuration, the calculation of the potential accident liability value can be continued until the vehicle stops. In such manner, it becomes possible to select a control plan for stopping the vehicle in a mode other than full braking. By making it possible to adopt a deceleration control mode other than the full brake mode, it is possible to reduce the risk of the tire slipping or locking.

Further, when an abnormality occurs in the recognition system for control planning, the diagnostic device 30 notifies the automatic drive device 20 and the safety evaluator 40 of such situation. In addition, when an abnormality occurs in the recognition system for control planning, the diagnostic device 30 may control the control planning unit F3 to generate a control plan for stopping the vehicle by using the recognition results of the fusion unit H2 for SE. According to such a configuration, the vehicle can be stopped more safely.

The risk determination unit G5 of the second embodiment may determine the risk level as 1, when it is determined that the fusion unit H2 for SE is not operating normally, for example. The risk level may be 2 when an abnormality has occurred in the fusion unit H2. Further, even if it is determined that the fusion unit H2 for SE is not operating normally, the risk level may be regarded as 0 as long as the fusion unit F2 for control planning is operating normally. This is because, as long as the fusion unit F2 for control planning is operating normally, the safety evaluator 40 can continue the calculation of the potential accident liability value by using the recognition result of the fusion unit F2 for control planning.

Further, the risk determination unit G5 may be configured to determine, when an abnormality occurs in both the fusion unit F2 for control planning and the fusion unit H2 for SE, the risk level as 2, and, when (i.e., as long as) at least one of the two is operating normally, the risk level as 1 or less. In addition, the risk level may be determined as 1 based on a determination that the map linkage unit H1 is not operating normally. Alternatively, if the second surrounding monitoring sensor 17 has an abnormal sensor and the degree of use of the abnormal sensor is equal to or higher than a predetermined risk determination threshold value, the risk level may be determined as 1.

According to the above-described configuration, the recognition results of the two recognition systems are compared, and then the abnormality diagnosis of each system is performed. By performing the abnormality diagnosis in each of the recognition systems in such manner, even if an abnormality occurs in both at the same time, it becomes possible to identify that the abnormality has occurred in both. In addition, when an abnormality of one of the two recognition systems is detected by comparing the recognition results of the two recognition systems, it is possible to identify which one has the abnormality based on the result of the sensor diagnosis process. When the diagnostic device 30 detects an abnormality in either the recognition system for control planning or the recognition system for the SE, it is preferable that the diagnostic device 30 performs at least a safety action such as deceleration or a handover request.

Figure 19:
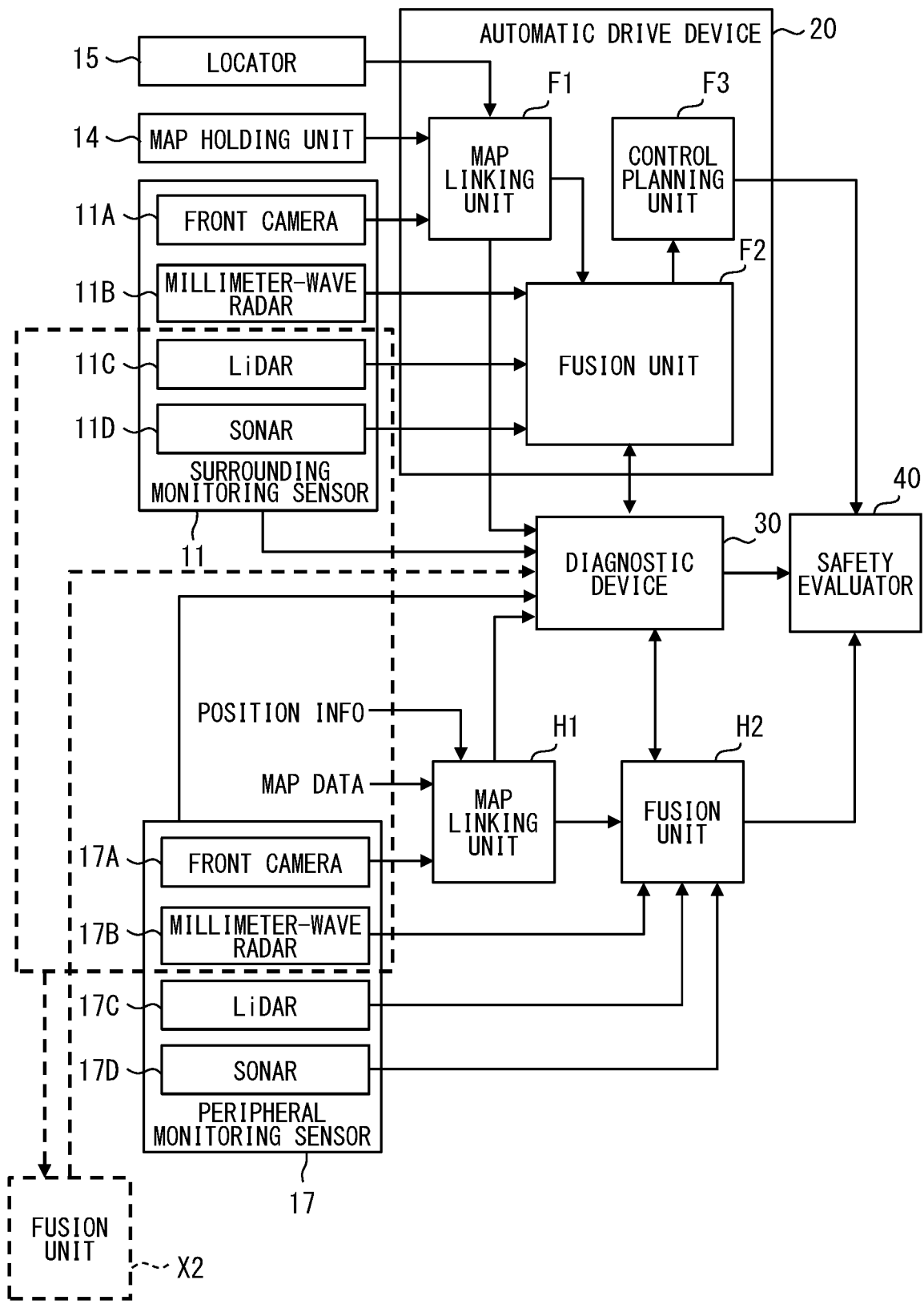
FIG. 19 is a diagram showing a modification of the configuration of the second embodiment.

Further, as shown in FIG. 19, the vehicle control system 1 may have a third fusion unit X2, which recognizes the surrounding environment by integrating the sensing information of a part of the first surrounding monitoring sensors 11 and the sensing information of a part of the second surrounding monitoring sensors 17. For example, the third fusion unit X2 may be configured to integrate the recognition results of the front camera 11A and the millimeter-wave radar 11B as the first surrounding monitoring sensor 11 and the recognition results of the LiDAR 17C and the sonar 17D as the second surrounding monitoring sensor 17. The third fusion unit X2 may be provided as a part of the automatic drive device 20 or as a part of the SE recognition device 50. The third fusion unit X2 may be provided by other ECU such as a driving support ECU, or may be built in the front camera 11A. The recognition result of the third fusion unit X2 is also input to the diagnostic device 30.

According to the above-described configuration, the diagnostic device 30 can detect an abnormal operation of one of the three by comparing the recognition results of the three fusion units F2, H2, and X2. For example, the abnormality detection unit G4 may identify a fusion unit that is operating abnormally by using a concept such as majority voting. The third fusion unit X2 can be realized by logically combining the first surrounding monitoring sensor 11 and the second surrounding monitoring sensor 17. Therefore, it is possible to provide "triple" redundancy without adding a new surrounding monitoring sensor 11 in terms of hardware.

ADDITIONAL NOTES

The control unit and the method therefor which have been described in the present disclosure may be also realized by a dedicated computer which constitutes a processor programmed to execute one or more functions realized by computer programs. Also, the device and the method therefor which have been described in the present disclosure may be also realized by a special purpose hardware logic circuit. Also, the device and the method therefor which have been described in the present disclosure may be also realized by one or more dedicated computers which are constituted by combinations of a processor for executing computer programs and one or more hardware logic circuits. The computer programs may be stored, as instructions to be executed by a computer, in a tangible non-transitory computer-readable storage medium. That is, the means and/or functions provided by the automatic drive device 20 and the diagnostic device 30 and the like is providable as the software recorded in the actual memory device and the computer, software only, hardware only, or a combination thereof. For example, some or all of the functions included in the diagnostic device 30 may be realized as hardware. A configuration in which a certain function is implemented as hardware includes a configuration in which the function is implemented by using one or more ICs or the like. The processing units 21, 31, 41, 51 may be realized by using an MPU or GPU instead of the CPU. The processing units 21, 31, 41, 51 may be realized by combining a plurality of types of arithmetic processing devices such as a CPU, MPU, and GPU. The processing units 21, 31, 41, 51 may be realized as a system-on-chip (SoC). Further, various processing units may be realized by using FPGA (field-programmable gate array) or ASIC (application specific integrated circuit). Various programs may be stored in a non-transitionary tangible storage medium. Various storage media such as HDD (Hard-disk Drive), SSD (Solid State Drive), EPROM (Erasable Programmable ROM), flash memory, USB memory, SD (Secure Digital) memory card and the like are usable as the storage medium for the program.

What is claimed is:

1. A vehicle control device used in a vehicle having a control planning unit that generates a control plan for autonomous travel of the vehicle and a safety evaluation unit that evaluates safety regarding the control plan generated by the control planning unit, the vehicle control device comprising:
an abnormality detection unit that detects an abnormality of a field recognition system including at least one surrounding monitoring sensor and a recognition unit, based at least on one of (a) an output signal of the at least one surrounding monitoring sensor detecting objects within a predetermined detection range and (b) a recognition result of the recognition unit recognizing objects near the vehicle based on the output signal of the at least one surrounding monitoring sensor; and
a vehicle stop processing unit that performs a process for stopping the vehicle based on a detection of the abnormality of the field recognition system by the abnormality detection unit, wherein
the abnormality detection unit compares a first process used by the control planning unit and a second process used by the safety evaluation unit, and determines that an abnormality is occurring when the first process and the second process are different from each other, and
the vehicle stop processing unit causes the safety evaluation unit to control a travel control actuator of the vehicle to decelerate the vehicle based on the process for stopping the vehicle.

2. The vehicle control device of claim 1, further comprising:
a recognition result acquisition unit that repeatedly and/or intermittently acquires the recognition result of the recognition unit; and
a recognition result holding unit that temporarily holds the recognition result acquired by the recognition result acquisition unit at a plurality of time points in association with a time of association, wherein
the abnormality detection unit
determines whether or not the recognition result is stable by referring to time-series data of the recognition result of the recognition unit for any one of the objects detected by the at least one surrounding monitoring sensor held by the recognition result holding unit, and determines that the abnormality has occurred in the field recognition system based on the object for which the recognition result is determined as unstable.

3. The vehicle control device of claim 1, wherein the at least one surrounding monitoring sensor comprises a plurality of the surrounding monitoring sensors,
  each of the plurality of the surrounding monitoring sensors outputs a signal indicating the recognition result regarding a position and type of the detected object as the output signal, and
  the abnormality detection unit diagnoses an operation situation of each of the plurality of surrounding monitoring sensors based on the output signal of the plurality of surrounding monitoring sensors.

4. The vehicle control device of claim 3, wherein
  the recognition unit identifies the type of the detected object by weighting and integrating the recognition results of the plurality of surrounding monitoring sensors, and
  the vehicle stop processing unit performs a process for stopping the vehicle based on the weight of the respective surrounding monitoring sensor that is determined to have the abnormality by the abnormality detection unit being equal to or greater than a predetermined threshold value.

5. The vehicle control device of claim 1 further comprising:
  at least one first surrounding monitoring sensor corresponding to the at least one surrounding monitoring sensor; and
  at least one second surrounding monitoring sensor mounted at a position different from the first surrounding monitoring sensor and, wherein
  as the recognition unit, a first recognition unit that performs a travel environment recognition process based on the output signal of the first surrounding monitoring sensor and a second recognition unit that performs the travel environment recognition process based on the output signal of the second surrounding monitoring sensor are provided, and
  the abnormality detection unit determines that the abnormality has occurred in the field recognition system based on un-matching between the recognition result of the first recognition unit and the recognition result of the second recognition unit.

6. The vehicle control device of claim 5, wherein
  the first surrounding monitoring sensor is a surrounding monitoring sensor mounted on the vehicle body, and
  the second surrounding monitoring sensor is a removable surrounding monitoring sensor retrofitted to the vehicle.

7. The vehicle control device of claim 1, wherein
  the at least one surrounding monitoring sensor is provided as and includes at least one of a camera, a millimeter-wave radar, a laser radar, and a sonar.

8. A vehicle control device comprising:
  an abnormality detection unit that detects an abnormality of a field recognition system including at least one surrounding monitoring sensor and a recognition unit, based at least on one of (a) an output signal of the at least one surrounding monitoring sensor detecting objects within a predetermined detection range and (b) a recognition result of the recognition unit recognizing objects near the vehicle based on the output signal of the at least one surrounding monitoring sensor; and
  a vehicle stop processing unit that performs a process for stopping the vehicle based on a detection of the abnormality of the field recognition system by the abnormality detection unit, wherein
  the at least one surrounding monitoring sensor comprises a plurality of the surrounding monitoring sensors,
  each of the plurality of the surrounding monitoring sensors outputs a signal indicating the recognition result regarding a position and type of the detected object as the output signal, and
  the abnormality detection unit diagnoses an operation situation of each of the plurality of surrounding monitoring sensors based on the output signal of the plurality of surrounding monitoring sensors,
  the recognition unit identifies the type of the detected object by weighting and integrating the recognition results of the plurality of surrounding monitoring sensors, a risk determination unit is provided for determining a risk level according to the weight f the respective surrounding monitoring sensor that is determined to have the abnormality by the abnormality detection unit,
  the vehicle stop processing unit performs a process for stopping the vehicle based on the risk level being equal to or higher than a predetermined threshold value, and
  the vehicle stop processing unit causes a safety evaluation unit to control a travel control actuator of the vehicle to decelerate the vehicle based on the process for stopping the vehicle.

9. A vehicle control device comprising:
  an abnormality detection unit that detects an abnormality of a field recognition system including at least one surrounding monitoring sensor and a recognition unit, based at least on one of (a) an output signal of the at least one surrounding monitoring sensor detecting objects within a predetermined detection range and (b) a recognition result of the recognition unit recognizing objects near the vehicle based on the output signal of the at least one surrounding monitoring sensor; and
  a vehicle stop processing unit that performs a process for stopping the vehicle based on a detection of the abnormality of the field recognition system by the abnormality detection unit, wherein
  the at least one surrounding monitoring sensor comprises a plurality of the surrounding monitoring sensors, each of the plurality of the surrounding monitoring sensors outputs a signal indicating the recognition result regarding a position and type of the detected object as the output signal, and
  the abnormality detection unit diagnoses an operation situation of each of the plurality of surrounding monitoring sensors based on the output signal of the plurality of surrounding monitoring sensors,
  the recognition unit identifies the type of the detected object by weighting and integrating the recognition results of the plurality of surrounding monitoring sensors,
  each of the plurality of surrounding monitoring sensors outputs a correct recognition probability indicating likeliness of the recognition result of the type of the detected object,
  the recognition unit changes the weight of each surrounding monitoring sensor when integrating the recognition results of the plurality of surrounding monitoring sensors based at least on one of the correct recognition probability and a driving scene, and the vehicle stop processing unit causes a safety evaluation unit to control a travel control actuator of the vehicle to decelerate the vehicle based on the process for stopping the vehicle.

10. A vehicle control device comprising:
an abnormality detection unit that detects an abnormality of a field recognition system including at least one surrounding monitoring sensor and a recognition unit, based at least on one of (a) an output signal of the at least one surrounding monitoring sensor detecting objects within a predetermined detection range and (b) a recognition result of the recognition unit recognizing objects near the vehicle based on the output signal of the at least one surrounding monitoring sensor; and
a vehicle stop processing unit that performs a process for stopping the vehicle based on a detection of the abnormality of the field recognition system by the abnormality detection unit, wherein
the at least one surrounding monitoring sensor comprises a plurality of the surrounding monitoring sensors,
each of the plurality of the surrounding monitoring sensors outputs a signal indicating the recognition result regarding a position and type of the detected object as the output signal, and
the abnormality detection unit diagnoses an operation situation of each of the plurality of surrounding monitoring sensors based on the output signal of the plurality of surrounding monitoring sensors,
each of the plurality of surrounding monitoring sensors, while holding information about a not-good-at object that is difficult for an other sensor to detect, which is one of the other surrounding monitoring sensors other than a subject surrounding monitoring sensor among the plurality of surrounding monitoring sensors, transmits, when detecting the not-good-at object of the other sensor, predetermined probability value correction information to the other sensor which is a not-good-at sensor not good at detecting the relevant object, the probability value correction information includes information indicating a position or direction in which the not-good-at object exists,
the at least one surrounding monitoring sensor corrects, when receiving the probability value correction information, the correct recognition probability of the recognition result of the position or direction in which the not-good-at object may exist based on the received probability value correction information, and
the vehicle stop processing unit causes a safety evaluation unit to control a travel control actuator of the vehicle to decelerate the vehicle based on the process for stopping the vehicle.

11. The vehicle control device of claim 10 further comprising:
a camera and a sonar provided as the at least one surrounding monitoring sensor, wherein
the camera notifies the sonar of the probability value correction information including the position or direction in which the detected object exists, when detecting at least one of a sponge-like object, a net-like structure, a floating structure which is afloat a predetermined distance above a road surface, a low-profile solid object whose height is less than a predetermined threshold value by analyzing a captured image, and the sonar lowers the correct recognition probability of the recognition result of the position or direction indicated by the probability value correction information.

12. The vehicle control device of claim 10 further comprising:
a camera and a laser radar provided as the at least one surrounding monitoring sensor, wherein
the camera notifies the laser radar of the probability value correction information including the position or direction in which the detected object exists, when detecting a black or silver object by analyzing a captured image, and
the laser radar lowers the correct recognition probability of the recognition result of the position or direction indicated by the probability value correction information.

13. A vehicle control device comprising:
an abnormality detection unit that detects an abnormality of a field recognition system including at least one surrounding monitoring sensor and a recognition unit, based at least on one of (a) an output signal of the at least one surrounding monitoring sensor detecting objects within a predetermined detection range and (b) a recognition result of the recognition unit recognizing objects near the vehicle based on the output signal of the at least one surrounding monitoring sensor; and
a vehicle stop processing unit that performs a process for stopping the vehicle based on a detection of the abnormality of the field recognition system by the abnormality detection unit, wherein
the at least one surrounding monitoring sensor comprises a plurality of the surrounding monitoring sensors,
each of the plurality of the surrounding monitoring sensors outputs a signal indicating the recognition result regarding a position and type of the detected object as the output signal, and
the abnormality detection unit diagnoses an operation situation of each of the plurality of surrounding monitoring sensors based on the output signal of the plurality of surrounding monitoring sensors,
each of the plurality of surrounding monitoring sensors, while holding information about a not-good-at situation in which a detection performance of an object by an other sensor deteriorates, which is one of the other surrounding monitoring sensors other than a subject surrounding monitoring sensor among the plurality of surrounding monitoring sensors, transmits, when detecting the not-good-at situation of the other sensor, predetermined probability value correction information to the other sensor which is a not-good-at sensor not good at detecting the object in the relevant situation, the probability value correction information includes information indicating (i) a type of the not-good-at situation and (ii) a direction of the not-good-at situation in which a detection performance of the other sensor may deteriorate due to the not-good-at situation,
the at least one surrounding monitoring sensor corrects, when receiving the probability value correction information, the correct recognition probability of the recognition result of the direction affected by the not-good-at situation based on the received probability value correction information, and the vehicle stop processing unit causes a safety evaluation unit to control a travel control actuator of the vehicle to decelerate the vehicle based on the process for stopping the vehicle.

14. A vehicle control device comprising:

an abnormality detection unit that detects an abnormality of a field recognition system including at least one surrounding monitoring sensor and a recognition unit, based at least on one of (a) an output signal of the at least one surrounding monitoring sensor detecting objects within a predetermined detection range and (b) a recognition result of the recognition unit recognizing objects near the vehicle based on the output signal of the at least one surrounding monitoring sensor; and a vehicle stop processing unit that performs a process for stopping the vehicle based on a detection of the abnormality of the field recognition system by the abnormality detection unit, wherein the at least one surrounding monitoring sensor comprises a plurality of the surrounding monitoring sensors, each of the plurality of the surrounding monitoring sensors outputs a signal indicating the recognition result regarding a position and type of the detected object as the output signal, and the abnormality detection unit diagnoses an operation situation of each of the plurality of surrounding monitoring sensors based on the output signal of the plurality of surrounding monitoring sensors, each of the plurality of surrounding monitoring sensors, while holding information about a not-good-at object that is difficult for other sensors to detect, which are the other surrounding monitoring sensors other than a subject surrounding monitoring sensor, transmits information, when detecting the not-good-at object of the other sensors, to the recognition unit as predetermined probability value correction information, the probability value correction information includes information indicating a type of the not-good-at object and the position or direction in which the not-good-at object exists, the recognition unit uses the probability value correction information to correct the correct recognition probability of the recognition result for each surrounding monitoring sensor, and integrates the recognition results of the plurality of surrounding monitoring sensors, and the vehicle stop processing unit causes a safety evaluation unit to control a travel control actuator of the vehicle to decelerate the vehicle based on the process for stopping the vehicle.

15. A vehicle control method for a vehicle having a control planning unit that generates a control plan for an autonomous travel of the vehicle and a safety evaluation unit that evaluates safety regarding the control plan generated by the control planning unit, the method comprising:

detecting an abnormality of a field recognition system including at least one surrounding monitoring sensor and a recognition unit, based at least on one of (a) an output signal of the at least one surrounding monitoring sensor detecting objects within a predetermined detection range and (b) a recognition result of the recognition unit recognizing objects near the vehicle based on the output signal of the at least one surrounding monitoring sensor; and performing a process for stopping the vehicle based on a detection of the abnormality of the field recognition system by the abnormality detection unit, wherein a first process used by the control planning unit is compared with a second process used by the safety evaluation unit, and an abnormality is determined to occur when the first process and the second process are different from each other, and the vehicle stop processing unit causes the safety evaluation unit to control a travel control actuator of the vehicle to decelerate the vehicle based on the process for stopping the vehicle.

16. A vehicle control device comprising:

a processor;
a computer-readable storage medium;
a fusion unit;
a map linking unit;
a first sensor; and
a second sensor, wherein the vehicle control device is configured to:
acquire recognition results for each sensor;
determine whether any sensor is abnormal;
set a risk level to a low level and maintain a normal control, upon determining:
(i) there is NO abnormal sensor,
(ii) the fusion unit is normal, and
(iii) the map linking unit is normal;
set the risk level to an intermediate level and request a safety action, upon determining:
(i) there is NO abnormal sensor,
(ii) the fusion unit is normal, and
(iii) the map linking unit is NOT normal;
set the risk level to the intermediate level and request the safety action, upon determining:
(i) there is at least one abnormal sensor, and
(ii) the at least one abnormal sensor is NOT heavily used;
set the risk level to a high level and request an emergency action, upon determining:
(i) there is at least one abnormal sensor, and
(ii) the at least one abnormal sensor is heavily used;
set the risk level to the high level and request the emergency action, upon determining:
(i) there is NO abnormal sensor, and
(ii) the fusion unit is NOT normal,
Wherein
the processor controls a travel control actuator of the vehicle to decelerate the vehicle based on the risk level.

17. A vehicle control device used in a vehicle having a control planning unit that generates a control plan for autonomous travel of the vehicle and a safety evaluation unit that evaluates safety regarding the control plan generated by the control planning unit, the vehicle control device comprising:

a processor;
a non-transitory computer-readable storage medium; and
a set of computer-executable instructions stored on the non-transitory computer-readable storage medium that cause the processor to:
detect an abnormality of a field recognition system including at least one surrounding monitoring sensor and a recognition unit, based at least on one of (a) an output signal of the at least one surrounding monitoring sensor detecting objects within a predetermined detection range and (b) a recognition result of the recognition unit recognizing objects near the vehicle based on the output signal of the at least one surrounding monitoring sensor; and perform a process for stopping the vehicle based on a detection of the abnormality of the field recognition system, wherein the set of computer-executable instructions further cause the processor to compare a first process used by the control planning unit and a second process used by the safety evaluation unit, and determine that an abnormality is occurring when the first process and the second process are different from each other, and the set of computer-executable instructions further cause the safety evaluation unit to control a travel control actuator of the vehicle to decelerate the vehicle based on the process for stopping the vehicle.

* * * * *